US009145069B2

(12) United States Patent
Yamada et al.

(10) Patent No.: US 9,145,069 B2
(45) Date of Patent: Sep. 29, 2015

(54) SEAT SLIDE APPARATUS FOR VEHICLE

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 60 days.

(21) Appl. No.: 14/190,293

(22) Filed: Feb. 26, 2014

(65) Prior Publication Data

US 2014/0239690 A1    Aug. 28, 2014

(30) Foreign Application Priority Data

Feb. 28, 2013   (JP) ................................ 2013-039663

(51) Int. Cl.
*B60N 2/02* (2006.01)
*B60N 2/07* (2006.01)
*B60N 2/08* (2006.01)
*B60N 2/12* (2006.01)

(52) U.S. Cl.
CPC ................ *B60N 2/07* (2013.01); *B60N 2/0705* (2013.01); *B60N 2/0818* (2013.01); *B60N 2/0875* (2013.01); *B60N 2/123* (2013.01)

(58) Field of Classification Search
CPC ............ B60N 2/12; B60N 2/123; B60N 2/07; B60N 2/0705; B60N 2/0818; B60N 2/0875
See application file for complete search history.

(56) References Cited

U.S. PATENT DOCUMENTS

| 5,918,846 A * | 7/1999 | Garrido ......................... 248/429 |
| 7,172,249 B2 * | 2/2007 | Rausch et al. ................ 297/341 |
| 2009/0058169 A1 * | 3/2009 | Soga ......................... 297/463.1 |
| 2011/0169294 A1 * | 7/2011 | Sandmann et al. ......... 296/65.15 |
| 2011/0233366 A1 * | 9/2011 | Mizuno et al. ................ 248/429 |

FOREIGN PATENT DOCUMENTS

| JP | 2006-281814 | 10/2006 |
| JP | 2011-201434 | 10/2011 |

OTHER PUBLICATIONS

U.S. Appl. No. 14/190,293, filed Feb. 26, 2014, Yamada, et al.
U.S. Appl. No. 14/190,308, filed Feb. 26, 2014, Yamada, et al.
U.S. Appl. No. 14/329,090, filed Jul. 11, 2014, Yamada, et al.

* cited by examiner

*Primary Examiner* — Philip Gabler
(74) *Attorney, Agent, or Firm* — Oblon, McClelland, Maier & Neustadt, L.L.P.

(57) ABSTRACT

A seat slide apparatus for a vehicle includes: a lower rail freely fixed to a vehicle floor; an upper rail freely fixed to a seat having a seat cushion forming a seating surface and a seatback; and a memory member engaging with the upper rail, wherein the memory member includes: a memory base provided to be movable in a forward-rearward direction of the seat; a memory pin mounted to be movable back and forth in a vertical direction with respect to the memory base; a first urging member urging the memory pin; a locking plate mounted to be movable in the forward-rearward direction of the seat with respect to the memory base; and a second urging member urging the locking plate.

11 Claims, 13 Drawing Sheets

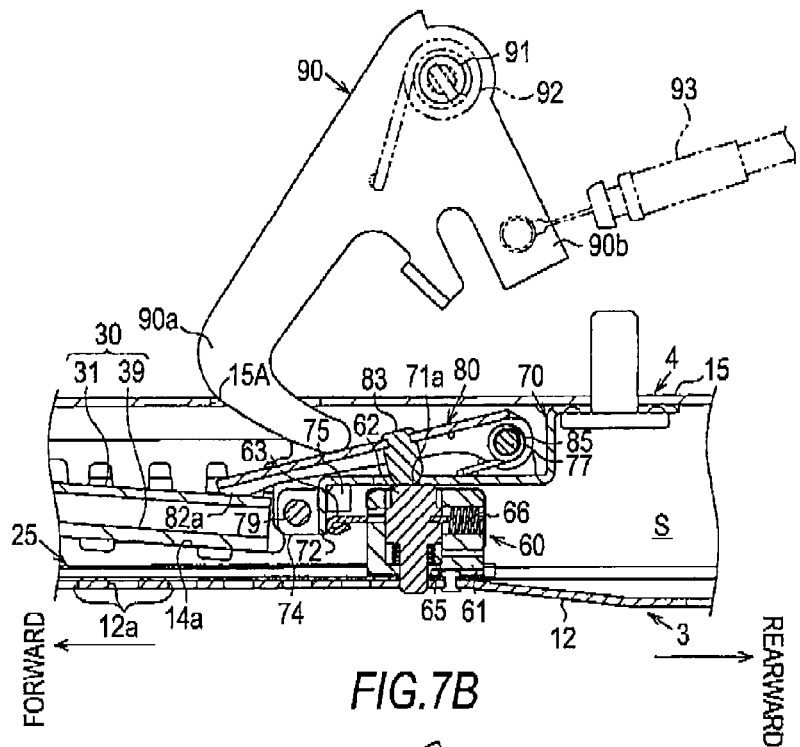
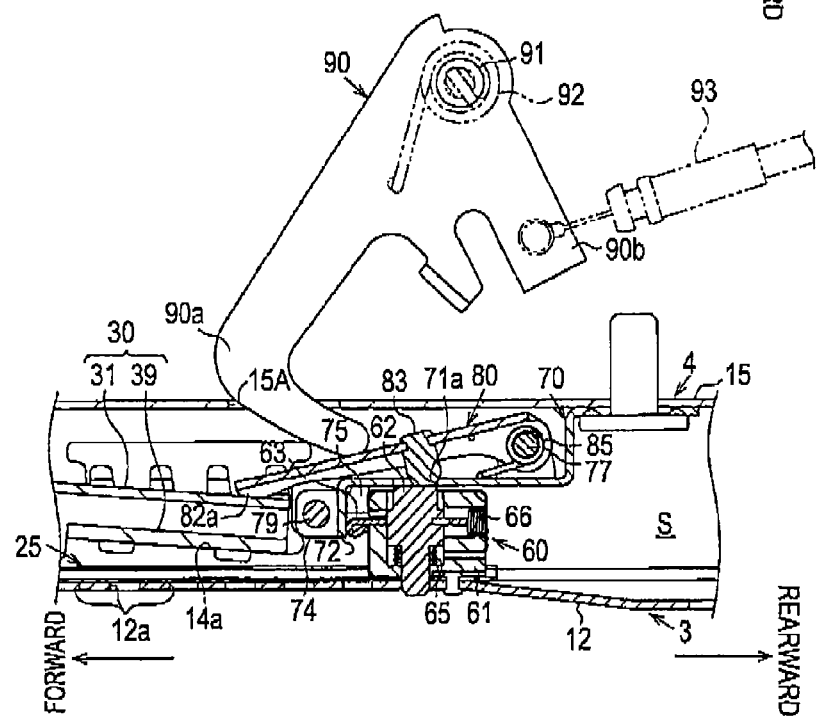

61 MEMORY BASE
62 MEMORY PIN
63 LOCKING PLATE
65 FIRST URGING MEMBER
66 SECOND URGING MEMBER

SEAT SLIDE APPARATUS FOR VEHICLE

CROSS REFERENCE TO RELATED APPLICATIONS

This application is based on and claims priority under 35 U.S.C. §119 to Japanese Patent Application 2013-039663, filed on Feb. 28, 2013, the entire contents of which are incorporated herein by reference.

TECHNICAL FIELD

This disclosure relates to a seat slide apparatus for a vehicle.

BACKGROUND DISCUSSION

In the related art, JP 2011-201434A (Reference 1) discloses such a seat slide apparatus for a vehicle, for example. As illustrated in FIG. 14, the apparatus includes a memory base 131 that is movable in a forward-rearward direction of a seat along a lower rail 110; and a memory pin 133 that is mounted to be movable back and forth in a vertical direction with respect to the memory base 131, engages with an upper rail 120 by protruding upward from the memory base 131 due to an urging force of a memory piece urging member 132 while being disengaged from the lower rail 110, engages with the lower rail 110 by protruding downward from the memory base 131 due to a downward pressing force applied thereto while being disengaged from the upper rail 120 when a seatback is shifted from a ready-for-seating state to a forward-inclined state (hereinafter, also referred to as "forward tilt").

The memory pin 133 is continuously pressed downward by a memory holding bracket 135 which approaches thereabove when the upper rail 120 moves in front of a seat after the forward tilt of the seatback, thereby maintaining an engagement state and the like with the lower rail 110.

Thereafter, in the forward tilt of the seatback, if the upper rail 120 moves behind a seat, a stopper member 136 which is fixed to a front end portion of the upper rail 120 abuts on the memory base 131, thereby being locked to be prevented from moving. Accordingly, relative positions (stored relative positions) of the lower rail 110 and the upper rail 120 before the upper rail 120 moves in front of the seat in accordance with the forward tilt of the seatback are restored. Subsequently, if the forward tilt is canceled by erecting the seatback, the memory pin 133 which is released from the downward pressing force protrudes from the memory base 131 due to the urging force of the memory piece urging member 132 and engages with the upper rail 120 while being disengaged from the lower rail 110.

Incidentally, according to Reference 1, since the engagement state of the memory pin 133 and the lower rail 110 is maintained when the upper rail 120 moves in front of the seat after the forward tilt of the seatback, the memory holding bracket 135 needs to be able to press the memory pin 133 downward throughout the entire movement range of the upper rail 120 with respect to the lower rail 110. For this reason, the memory holding bracket 135 is configured to extend inside the upper rail 120 along in a longitudinal direction, thereby causing a disposition space necessary for an inside of the rail to be increased.

SUMMARY

Thus, a need exists for a seat slide apparatus which is not suspectable to the drawback mentioned above.

An aspect of this disclosure provides a seat slide apparatus for a vehicle including: a lower rail that is configured to fixed to a vehicle floor; an upper rail that is configured to fixed to a seat which has a seat cushion forming a seating surface and a seatback being supported at a rear end portion of the seat cushion to freely inclined and is connected to be relatively movable with respect to the lower rail in a forward-rearward direction of the seat; and a memory member that engages with the upper rail while being disengaged from the lower rail to be integrally movable with the upper rail when the seatback is in a ready-for-seating state, engages with the lower rail while being disengaged from the upper rail when the seatback is shifted from the ready-for-seating state to a forward-inclined state, and abuts on the upper rail when the upper rail moves behind a seat with respect to the lower rail so as to regulate the upper rail moving behind the seat in a state of engaging with the lower rail while being disengaged from the upper rail, wherein the memory member includes: a memory base which is provided to be movable in the forward-rearward direction of the seat along the lower rail and abuts on the upper rail moving behind the seat when the seatback is shifted from the ready-for-seating state to the forward-inclined state; a memory pin which is mounted to be movable back and forth in a vertical direction with respect to the memory base, is configured to be applied with a downward pressing force when the seatback is shifted from the ready-for-seating state to the forward-inclined state, engages with the upper rail while being disengaged from the lower rail in a state of protruding upward from the memory base, and engages with the lower rail while being disengaged from the upper rail in a state of protruding downward from the memory base; a first urging member which urges the memory pin from the memory base to a side protruding upward; a locking plate which is mounted to be movable in the forward-rearward direction of the seat with respect to the memory base, locks the memory pin to be prevented from moving upward in a state where the memory pin moves in front of the seat while being in a state of protruding downward from the memory base, and moves behind the seat from a front position of the seat while unlocking the memory pin prevented from moving upward by abutting on the upper rail moving behind the seat; and a second urging member which urges the locking plate to a side moving in front of the seat.

With this configuration, the memory pin protruding downward from the memory base is locked to be prevented from moving upward by moving the locking plate in front of the seat due to an urging force of the second urging member. Therefore, even if the upper rail moves in front of the seat when the seatback is shifted from the ready-for-seating state to the forward-inclined state and the memory pin is released from the downward pressing force, the memory pin maintains a state of protruding downward from the memory base, that is, a state of engaging with the lower rail.

Thereafter, the upper rail which has moved in front of the seat moves behind the seat, thereby being locked to be prevented from moving by abutting on the memory base which is fixed to the lower rail through the memory pin in the state of engaging with the lower rail. In this case, relative positions of the lower rail and the upper rail are restored to the positions immediately before the upper rail moves in front of the seat while the seatback is shifted from the ready-for-seating state to the forward-inclined state. In addition, in this case, the upper rail abuts on the locking plate, and thus, the locking plate moves behind the seat against the urging force of the second urging member. Accordingly, the memory pin prevented from moving upward by the locking plate is unlocked.

Therefore, in this state, if the forward-inclined state of the seatback shifted from the ready-for-seating state is canceled, the memory pin released from the downward pressing force is urged by the first urging member, thereby protruding upward from the memory base. Then, the memory pin engaged with the upper rail is integrally movable with the upper rail together with the memory base and the like.

As above, if the seatback is shifted from the ready-for-seating state to the forward-inclined state, since the memory member itself can maintain the engagement state between the memory pin and the lower rail, it is possible to cause the overall configuration of the apparatus to be simple and compact.

In the seat slide apparatus for a vehicle, it is preferable that a locked groove is formed in the memory pin, an open hole through which the memory pin is smoothly inserted in the vertical direction is formed in the locking plate, and the locking plate locks the memory pin to be prevented from moving upward by fitting an edge portion of the open hole on a rear side of a seat into the locked groove of the memory pin protruding downward from the memory base in a state of moving in front of the seat due to the urging force of the second urging member.

With this configuration, it is possible to lock the memory pin to be prevented from moving upward through a significantly simple configuration in which the edge portion of the open hole on the rear side of a seat fits into the locked groove of the memory pin due to the urging force of the second urging member.

The aspect of this disclosure provides an effect to further decrease a disposition space necessary for an inside of the rail.

BRIEF DESCRIPTION OF THE DRAWINGS

The foregoing and additional features and characteristics of this disclosure will become more apparent from the following detailed description considered with the reference to the accompanying drawings, wherein:

FIG. 7A is a longitudinal sectional view illustrating a state where a locking plate and a pressing piece are in contact with each other in accordance with a rearward movement after a forward movement, and FIG. 7B is a longitudinal sectional view illustrating an abutting state of a memory base and a stopper piece in the same condition;

DETAILED DESCRIPTION

Hereinafter, an embodiment of a seat slide apparatus for a vehicle will be described. In the following, a vehicle forward-rearward direction is referred to as a "forward-rearward direction".

Figure 13:
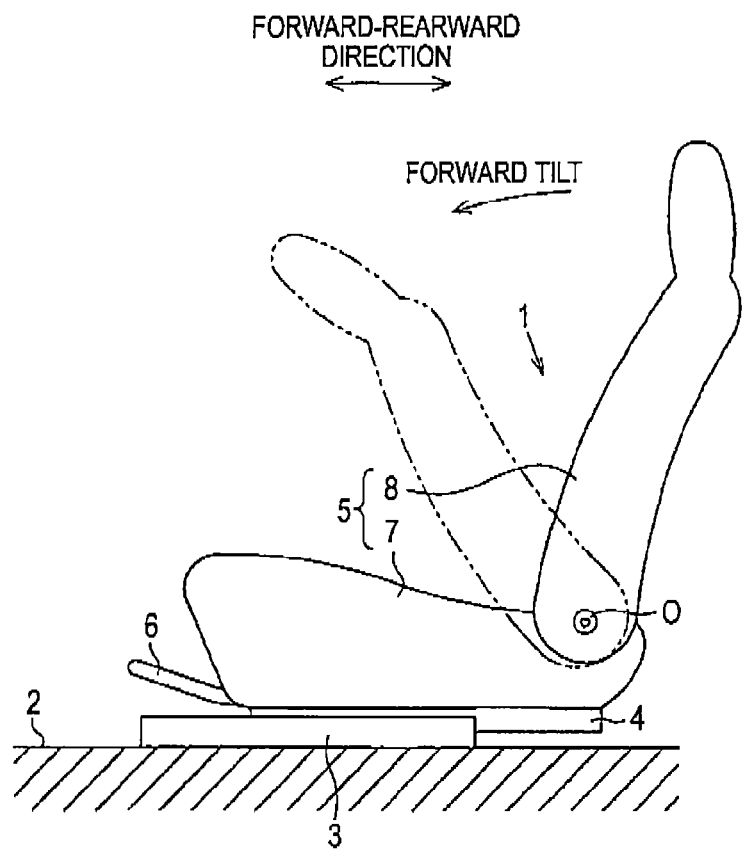
FIG. 13 is a side view illustrating a seat for a vehicle to which this disclosure is applied.
Figure 14:
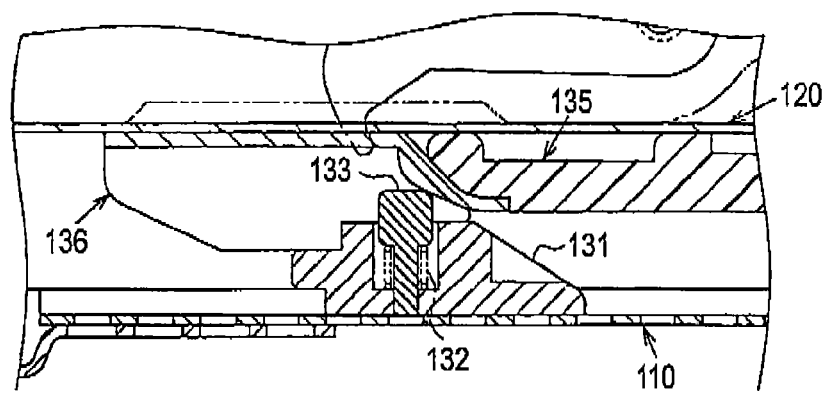
FIG. 14 is a longitudinal sectional view illustrating an embodiment in the related art.

As illustrated in FIG. 13, a lower rail 3 is fixed to a vehicle floor 2 in an aspect of extending in the forward-rearward direction, and an upper rail 4 is mounted on the lower rail 3 to be relatively movable in the forward-rearward direction with respect to the lower rail 3. In other words, in the embodiment, a longitudinal direction of the lower rail 3 and the upper rail 4, that is, a relative movement direction (forward-rearward direction of seat) thereof corresponds to the forward-rearward direction.

The lower rails 3 and the upper rails 4 are respectively arranged forming a pair in a width direction (direction orthogonal to paper surface in FIG. 1), and the drawing illustrates the rails which are disposed on a left side when facing forward (in front of seat). Then, a seat 5 forming a seating portion for a crew is fixed to and supported by both of the upper rails 4. The seat 5 is configured to include a seat cushion 7 that forms a seating surface and a seatback 8 that is supported at a rear end portion of the seat cushion 7 to freely inclined about an turning axis O. The lower rail 3 and the upper rail 4 are basically in a locking state to be prevented from relatively moving, and there is provided an unlocking handle 6 that releases a locked state.

Figure 1:
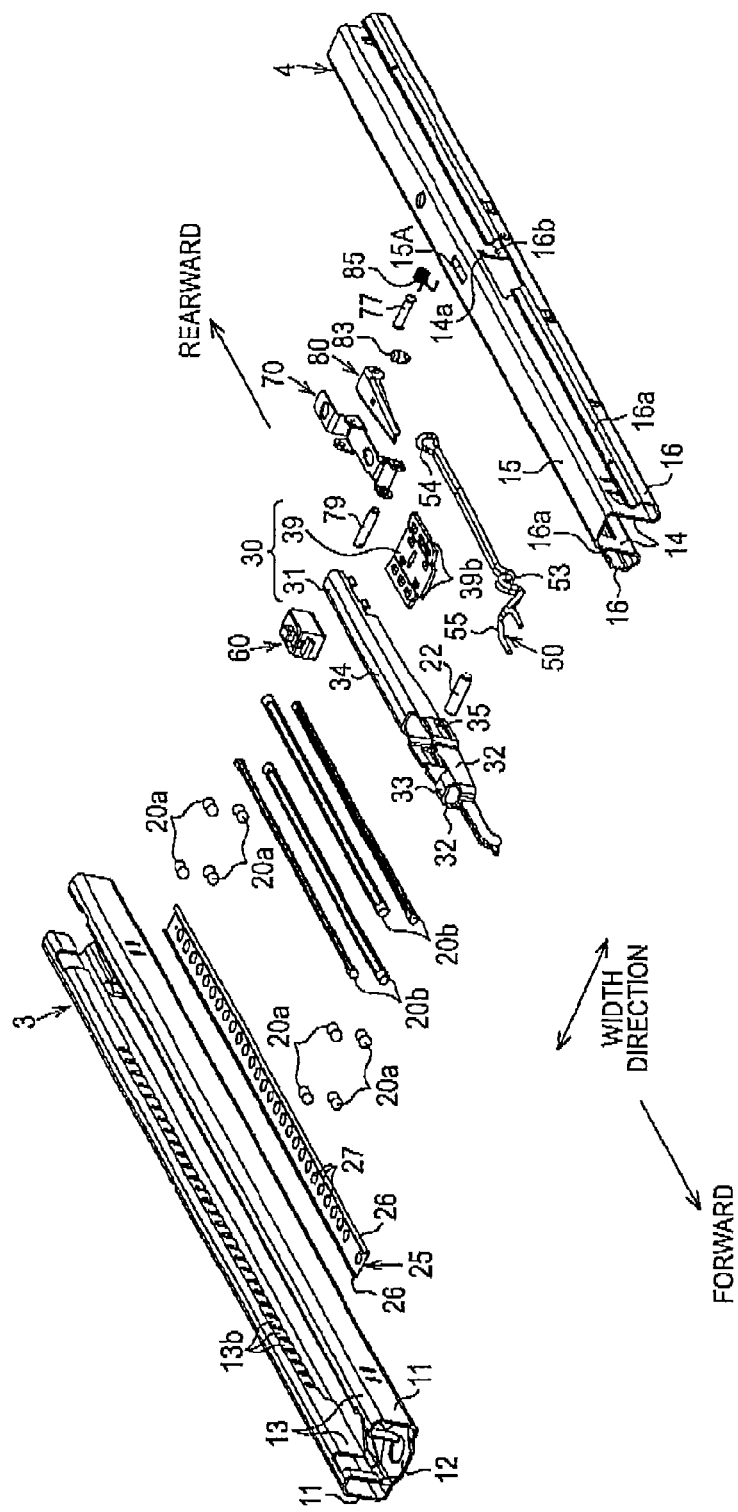
FIG. 1 is an exploded perspective view illustrating an embodiment disclosed here.

As illustrated in FIG. 1, the lower rail 3 is formed of a plate material and has a pair of first vertical wall portions 11 and a bottom wall portion 12. The pair of first vertical wall portions 11 extend in a vertical direction on both sides in the width direction, and the bottom wall portion 12 connects both of lower ends of these first vertical wall portions 11 to each other. Then, in an upper end of each first vertical wall portion 11, a first flange 13 is continuously formed which protrudes inwardly in the width direction, and then, is folded downward to the lower end side of the first vertical wall portion.

Figure 2:
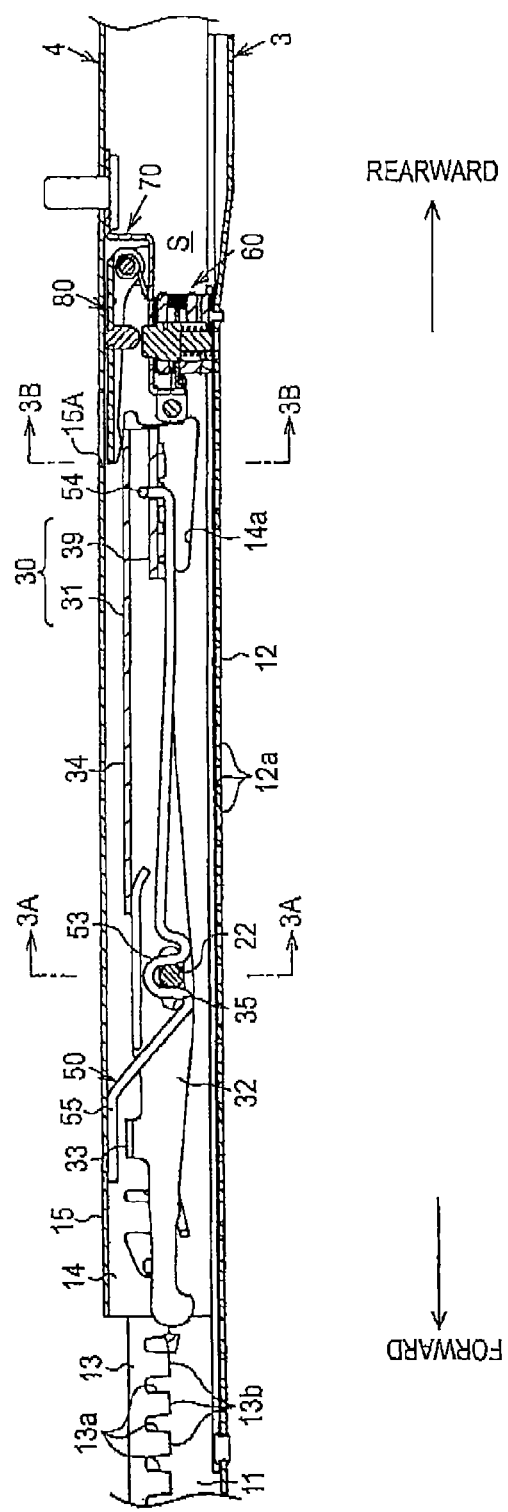
FIG. 2 is a longitudinal sectional view illustrating the same embodiment.

In addition, as collectively illustrated in FIG. 2, in an intermediate portion of each first flange 13 of the lower rail 3 in the longitudinal direction, a plurality of notches 13a are formed upward from a tip (lower end) thereof at the predetermined intervals in the same direction and a plurality of square tooth-shaped locking claws 13b are formed between each of the adjacent notches 13a. Therefore, the plurality of locking claws 13b are provided in parallel in the longitudinal direction of the lower rail 3 at the predetermined intervals.

Figure 3A:
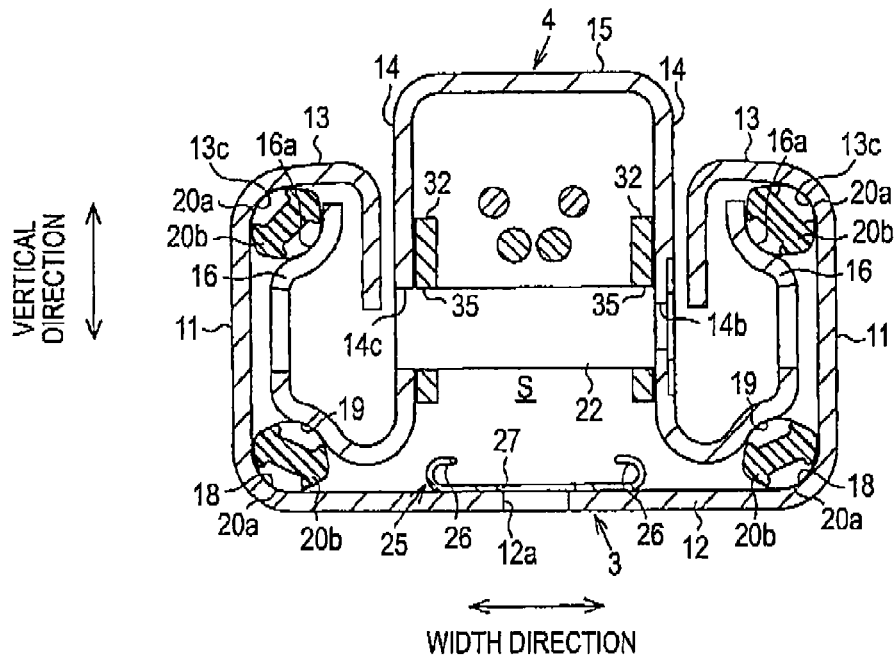
FIGS. 3A and 3B are cross-sectional views taken along lines IIIA-IIA and IIIB-IIIB in FIG. 2.

As illustrated in FIG. 3A, a connection portion between each first vertical wall portion 11 and the bottom wall portion 12 forms a first lower side ball guide 18 having an approximately arc-shaped cross section to project obliquely outward on a lower side. Meanwhile, a connection portion between each first flange 13 and the first vertical wall portion 11 forms a first upper side ball guide 13c having the approximately arc-shaped cross section to project obliquely outward on an upper side.

The upper rail 4 is formed of the plate material and has a pair of second vertical wall portions 14 and a lid wall portion 15. The pair of second vertical wall portions 14 extend in the vertical direction between both of the first flanges 13 of the lower rail 3, and a lid wall portion 15 connects both the upper ends of these second vertical wall portions 14 to each other. Then, in a lower end of each second vertical wall portion 14, a second flange 16 is continuously formed which protrudes outwardly in the width direction, and then, is folded upward so as to be surrounded by the first vertical wall portion 11 and the first flange 13.

In other words, the lower rail 3 and the upper rail 4 each have an approximately U-shaped cross section in the rail of which open sides confronts with each other and are mainly prevented from being detached in the vertical direction by engagement between the first flange 13 and the second flange 16. The cross section of the rails which is formed by the lower rail 3 and the upper rail 4 is in a rectangular shape, a so-called box shape. The lower rail 3 forms a space S in association with the upper rail 4.

A lower end portion of each second flange 16 forms a second lower side ball guide 19 having the approximately arc-shaped cross section to project obliquely inward on the upper side. Meanwhile, an upper end portion of each second flange 16 forms a second upper side ball guide 16a having the approximately arc-shaped cross section to project obliquely inward on the lower side.

A plurality of spherical-shaped balls 20a are interposed between each second lower side ball guide 19 and the first lower side ball guide 18 facing each other, and between each second upper side ball guide 16a and the first upper side ball guide 13c facing each other.

As illustrated in FIG. 1, each ball 20a is mounted on a resin-made holder 20b extending in the forward-rearward direction (longitudinal direction of rail). The balls 20a mounted on each of the holders 20b add up to four in total. One pair of them are disposed in a front end portion of the holder 20b and the other pair are disposed in a rear end portion thereof. The upper rail 4 is supported to freely slide in the longitudinal direction (forward-rearward direction) with respect to the lower rail 3 so as to roll each of the balls 20a between the lower rail 3 and the upper rail 4.

In both of the second vertical wall portions 14 of the upper rail 4, approximately square-shaped open holes 14a communicating in the width direction on a central portion thereof in the longitudinal direction are respectively formed. In addition, in an upper end portion (second upper side ball guide 16a) of each of the second flanges 16 of the upper rail 4, approximately square-shaped notches 16b are respectively formed matching positions of the open holes 14a in the longitudinal direction thereof. Each of the notches 16b is open upward to communicate in the width direction.

In addition, as illustrated in FIG. 3A, in both of the second vertical wall portions 14, concentric circle-shaped axis attachment holes 14b and 14c are respectively formed in front of a vehicle from the open holes 14a communicating with each other in the width direction. An inner diameter of the axis attachment hole 14b at one side is set smaller than an inner diameter of the axis attachment hole 14c at the other side. Then, a columnar-shaped support axis 22 inserted into the axis attachment holes 14b and 14c at both end portions thereof is supported by both of the second vertical wall portions 14. Needless to mention, a center line of this support axis 22 extends in the width direction.

The support axis 22 is fastened to the corresponding second vertical wall portion 14 at one end portion which is inserted into the axis attachment hole 14b and connected to be movable in the width direction with respect to the corresponding second vertical wall portion 14 at the other end portion which is inserted into the axis attachment hole 14c. This is done in order to absorb the deformation by moving the support axis 22 in the width direction when the deformation is generated in a cross-sectional shape of the upper rail 4 in accordance with interposition of the above-described ball 20a and the like between the lower rail 3 and the upper rail 4. In addition, the axis attachment holes 14b and 14c (support axis 22) are disposed in the central portion of the second lower side ball guide 19 and the second upper side ball guide 16a (slide portion for a pair of upper and lower balls 20a) in the vertical direction. This is done in order to suppress the deformation of the axis attachment holes 14b and 14c being minimized when a deformation is generated in the cross-sectional shape of the upper rail 4 in the above-described aspect.

As illustrated in FIG. 1, inside the upper rail 4, a locking lever 30 is connected to both of the second vertical wall portions 14 inwardly in the width direction to freely turn by the support axis 22. In other words, the locking lever 30 includes a handle portion 31 configured of the plate material extending in the forward-rearward direction. The handle portion 31 is erected in an aspect in which a pair of vertical wall portions 32 extending in the longitudinal direction thereof are erected in an aspect of being in parallel in the width direction. A distance between both of these vertical wall portions 32 in the width direction is set smaller than a distance between both of the second vertical wall portions 14 of the upper rail 4 in the width direction. Then, both of the vertical wall portions 32 are connected with each other in the width direction at each front end portion between upper end edges by a connection wall 33, and connected with each other in the width direction at each rear end portion between the upper end edges by a top plate portion 34.

In both of the vertical wall portions 32, long holes 35 extending in the forward-rearward direction at a position equivalent to the support axis 22 (axis attachment holes 14b and 14c) in the vertical direction are respectively formed. An opening width of these long holes 35 in a short direction (vertical direction) is set equivalent to a diameter of the support axis 22. The support axis 22 inserted into each of the axis attachment holes 14b and 14c at respective end portions thereof is inserted through both of the long holes 35 in a state where both of the vertical wall portions 32 of the handle portion 31 are interposed therebetween by both of the second vertical wall portions 14 of the upper rail 4 in the width direction. Accordingly, the handle portion 31 is connected to freely turn with respect to the upper rail 4 in the vertical direction in a state where movement in the forward-rearward direction within a range of the long hole 35 is allowed.

In addition, the locking lever 30 includes a locking plate 39 formed of the plate material and fixed to a lower portion of the rear end portion of the handle portion 31. As collectively illustrated in FIG. 3B, the locking plate 39 spreads in the forward-rearward direction and the width direction in an aspect of penetrating the open hole 14a and the notch 16b in the width direction. Then, locking holes 39b which are open in the vertical direction facing each of the first flanges 13 are formed in the locking plate 39. The plurality (three) of locking holes 39b are provided in parallel at the predetermined intervals in the forward-rearward direction and disposed at a position capable of corresponding to the plurality (three) of locking claws 13b adjacent to each other in the longitudinal direction of the lower rail 3.

Figure 3B:
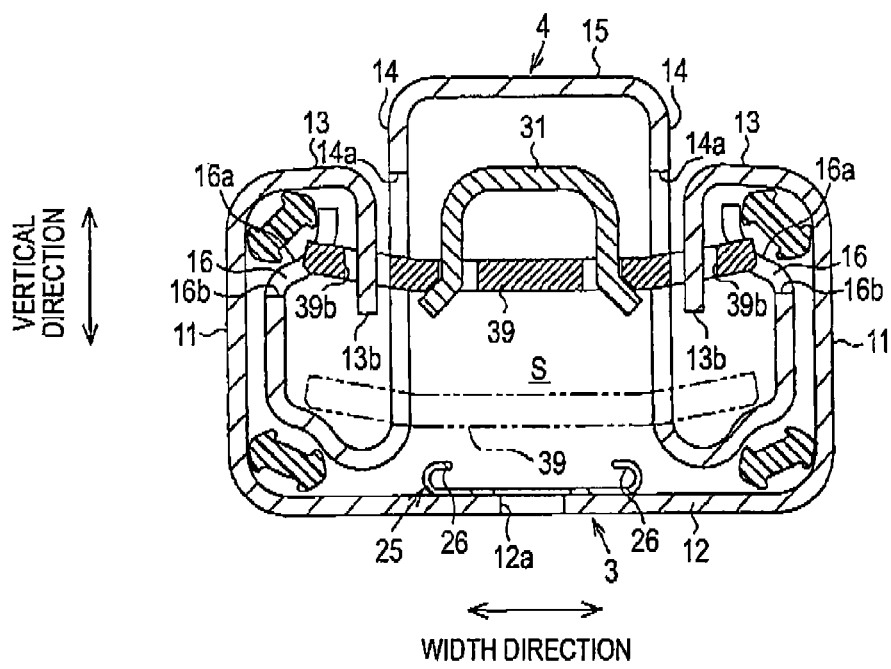

Then, as illustrated in a solid line in FIG. 3B, when the locking lever 30 turns about the support axis 22 so as to cause the locking plate 39 to be lifted, the corresponding locking claws 13b can fit into each of the locking holes 39b. When the corresponding locking claws 13b are inserted into each of the locking holes 39b, the lower rail 3 and the upper rail 4 are locked to be prevented from relatively moving. Meanwhile, as illustrated in a double-dotted chain line in FIG. 3B, when the locking lever 30 turns about the support axis 22 so as to cause the locking plate 39 to be lowered, each of the locking holes 39b is set to be detached from the corresponding locking claws 13b. In this case, the lower rail 3 and the upper rail 4 prevented from relatively moving are unlocked.

A size of the locking plate 39 in the width direction is set larger than a distance between both of the second upper side ball guides 16a of the upper rail 4 in the width direction and set smaller than a distance between both of the second flanges 16 in the width direction which are lower than the second upper side ball guides 16a. Therefore, even though the locking plate 39 penetrates the notch 16b in the width direction in a state where the lower rail 3 and the upper rail 4 are locked to be prevented from relatively moving, there is no interference with the second flanges 16 in a state in which the prevented relative movements are unlocked.

As illustrated in FIG. 1, a locking spring 50 formed with one rod of a wire material is disposed inside the upper rail 4. The locking spring 50 is formed to have an approximately prone U shape open to the front side in a planar view. Then, the locking spring 50 has a wedge portion 53 which is formed by causing an intermediate portion thereof in the longitudinal direction to meanderingly protrude upward, and a lever side locking end portion 54 which is formed by causing a rear end portion thereof to bend upward. In addition, a front end portion of the locking spring 50 forms a rail side locking end portion 55. As collectively illustrated in FIG. 2, the locking spring 50 causes the support axis 22 to be inserted between the wedge portion 53 from above the support axis 22, the lever side locking end portion 54 to be inserted through and fixed to the locking plate 39 from below the locking plate 39, and the rail side locking end portion 55 to abut on a lower surface of the lid wall portion 15 of the upper rail 4, thereby being supported by the upper rail 4 and the like.

In this case, the locking spring 50 turns the locking lever 30 to be urged to a side where the locking plate 39 is lifted in the lever side locking end portion 54, that is, a side where the corresponding locking claw 13b fits into each locking hole 39b. In addition, the locking spring 50 urges the support axis 22 downward, that is, in a direction where the long hole 35 intersects in the longitudinal direction in the wedge portion 53 by a reaction, thereby locking the support axis 22 to be prevented from moving in the forward-rearward direction inside the long hole 35. In other words, a position of the support axis 22 in the forward-rearward direction inside the long hole 35 is urged and held by the wedge portion 53 of the locking spring 50.

The unlocking handle 6 is made by bending a cylindrical material and inserted into the upper rail 4 from a front side opening end of the upper rail 4 while a front end portion of the handle portion 31 is inserted therein, thereby being connected to the locking lever 30. Therefore, basically, the unlocking handle 6 integrally turns about the support axis 22 with the locking lever 30. Then, if a front end of the unlocking handle 6 is lifted, the locking lever 30 turns about the support axis 22 along with the unlocking handle 6 to a side where the locking plate 39 is lowered, that is, a side where each locking hole 39b is detached from the corresponding locking claw 13b against the urging force of the locking spring 50.

Here, an operation force upon the unlocking handle 6 is considered to be released. In this case, the locking lever 30 turns about the support axis 22 along with the unlocking handle 6 to a side where the locking plate 39 is lifted, that is, a side where each locking hole 39b fits into the corresponding locking claw 13b by the urging force of the locking spring 50, thereby locking the lower rail 3 and the upper rail 4 to be prevented from relatively moving in the above-described aspect. Then, a position of the seat 5 in the forward-rearward direction supported by the upper rail 4 is held.

Thereafter, the unlocking handle 6 is considered to be in an operation being lifted at the front end thereof. In this case, against the urging force of the locking spring 50, the locking lever 30 turns about the support axis 22 along with the unlocking handle 6 to the side where the locking plate 39 is lowered, that is, the side where each locking hole 39b is detached from the corresponding locking claw 13b, thereby unlocking the lower rail 3 and the upper rail 4 prevented from relatively moving in the above-described aspect. Then, it is possible to adjust the position of the seat 5 in the forward-rearward direction supported by the upper rail 4.

Next, surrounding structure of the lower rail 3 and the like on one side between the lower rails 3 and the like forming a pair will be described.

Figure 4A:
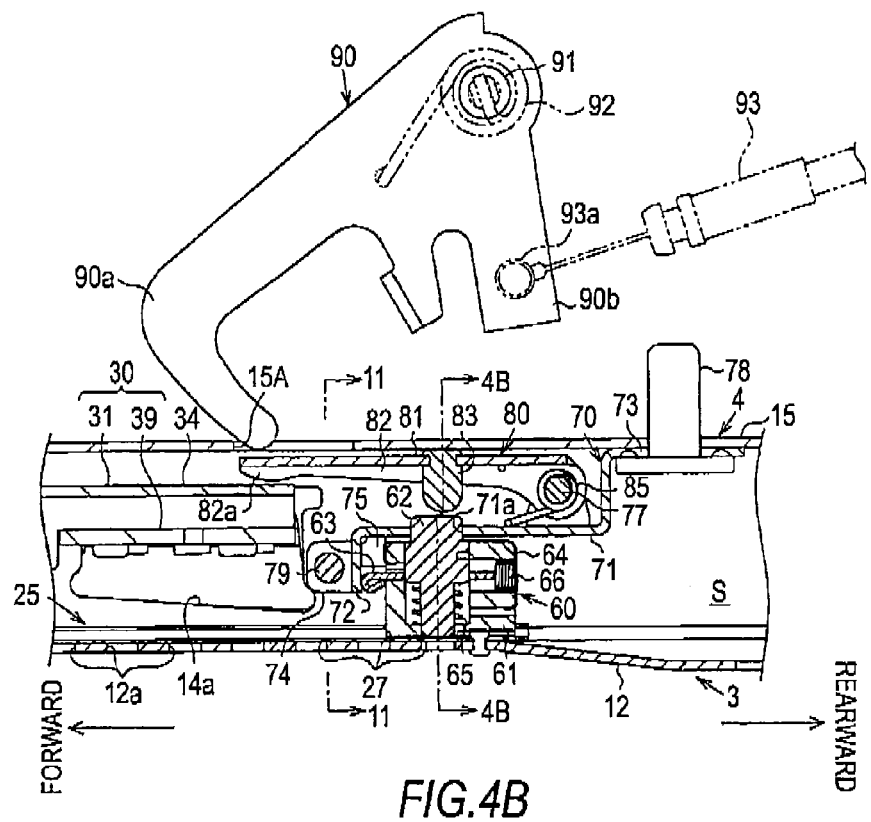
FIG. 4A is a longitudinal sectional view illustrating a locked state of relative movements to be prevented.
Figure 4B:
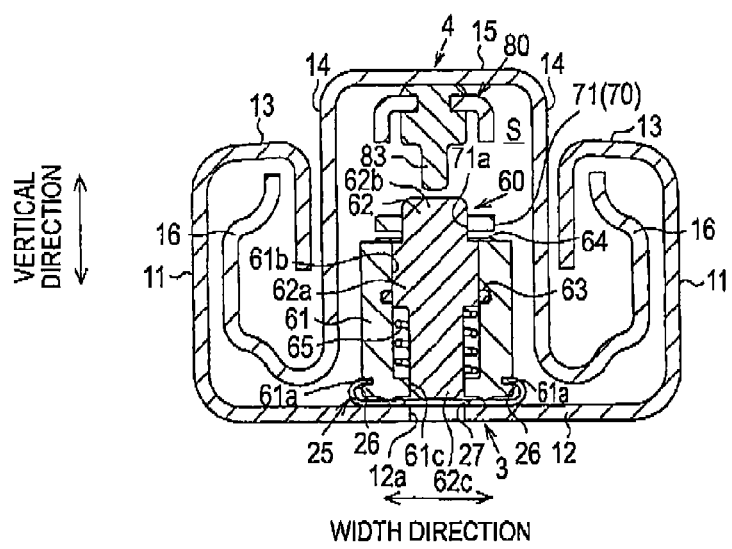
FIG. 4B is a cross-sectional view taken along line IVB-IVB in FIG. 4A.

As illustrated in FIGS. 4A and 4B, a plurality of circle-shaped lower side locking holes 12a are formed at the predetermined intervals in the bottom wall portion 12 of the lower rail 3 in the longitudinal direction thereof. Then, an approximately elongated memory guide 25 formed of the plate material having a width smaller than a distance between both of the second vertical wall portions 14 of the upper rail 4 is extended along the plurality of lower side locking holes 12a in the bottom wall portion 12. This memory guide 25 has a pair of guide claws 26 which are inwardly folded in the width direction to cause both of the end portions thereof to face each other in the width direction while having an approximately C-shaped cross section, and a plurality of circle-shaped penetration holes 27 are formed respectively facing the plurality of lower side locking holes 12a in a central portion thereof in the width direction. Therefore, the plurality of penetration holes 27 also are provided in parallel in the longitudinal direction of the lower rail 3 at the predetermined intervals. An inner diameter of the penetration hole 27 is set greater than an inner diameter of the lower side locking hole 12a.

Figure 8:
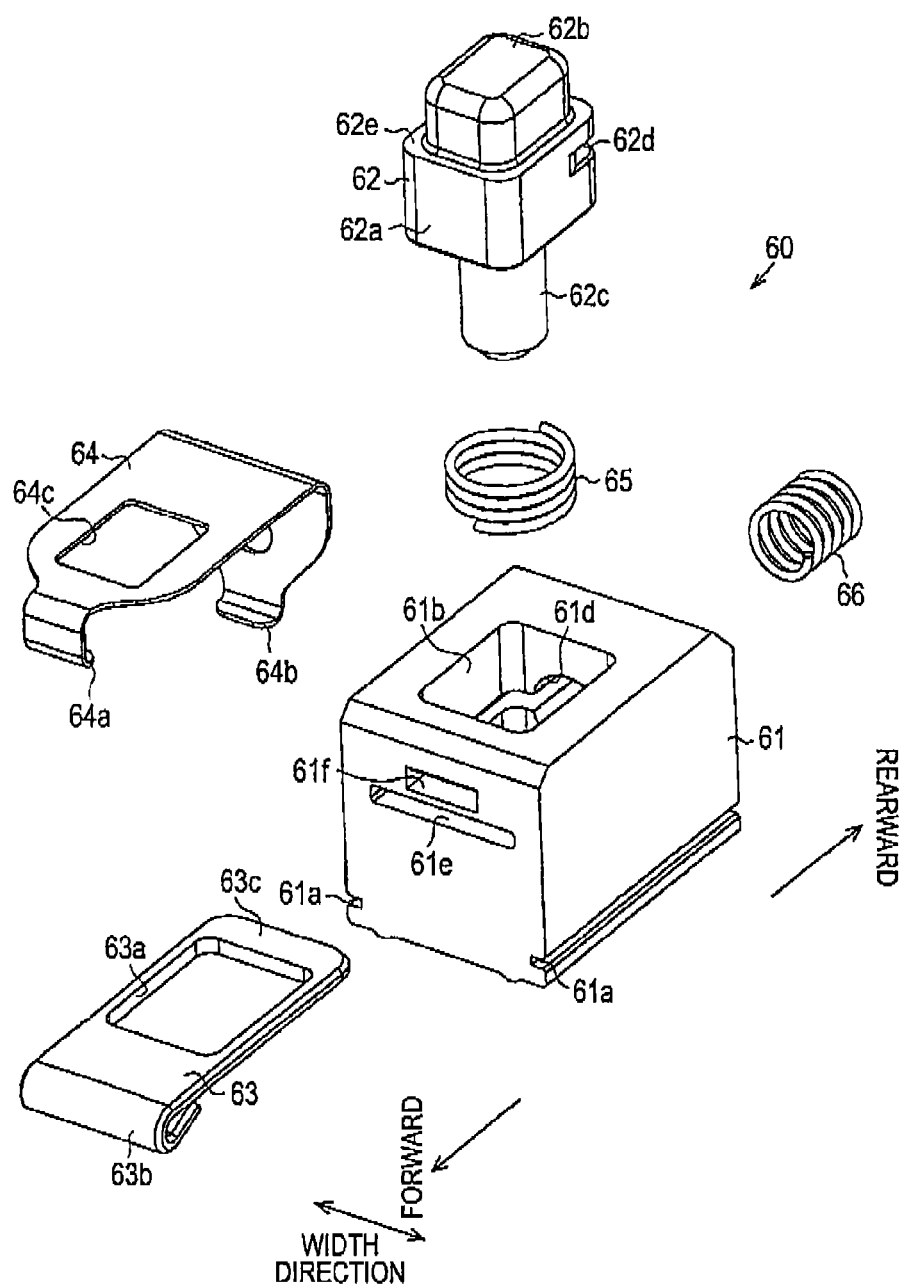
FIG. 8 is an exploded perspective view of a memory piece.

A memory piece 60 is placed in the memory guide 25. As collectively illustrated in FIGS. 8 to 9B, this memory piece 60 is configured to include a memory base 61, a memory pin 62, a lacking plate 63 and a detachment prevention plate 64 as well as a first urging member 65 and a second urging member 66 formed with a coil spring, for example.

The memory base 61 is formed in an approximate block shape having a width equivalent to a width of the memory guide 25 and configured to be movable in the forward-rearward direction (forward-rearward direction of seat) along the memory guide 25 (lower rail 3). In other words, in the memory base 61, a pair of guide grooves 61a which are inwardly concave in the width direction facing each other from both end surfaces thereof in the width direction are formed across the overall length in the forward-rearward direction. The memory base 61 moves in the forward-rearward direction along the memory guide 25 while being guided by both of the guide claws 26 by causing both of the guide claws 26 of the memory guide 25 to be locked into both of the guide grooves 61a to freely slide in the forward-rearward direction.

In addition, in the memory base 61, an approximately square-shaped guide hole 61b is formed to be open upward, and a circle-shaped penetration hole 61c penetrating a bottom wall of the guide hole 61b is formed having an inner diameter equivalent to the inner diameter of the lower side locking hole 12a. Then, in the guide hole 61b of the memory base 61, the first urging member 65 is accommodated and the memory pin 62 is mounted in an aspect of being inserted through the first urging member 65. The memory pin 62 has a main body portion 62a formed in an approximately square prism shape corresponding to an outer shape of the guide hole 61b and movement thereof in the vertical direction is guided in the main body portion 62a by the guide hole 61b. In this case, the memory pin 62 is constantly urged to an upward moving side by causing the main body portion 62a to be placed on the first urging member 65.

The memory pin 62 has an approximately square prism-shaped head portion 62b of which size is smaller than the main body portion 62a in the width direction and the forward-rearward direction while protruding upward. The memory pin 62 has an approximately columnar-shaped locking portion 62c which is concentric with the penetration hole 61c and penetrates the first urging member 65 from the main body portion 62a while protruding downward. An outer diameter of the locking portion 62c is set equivalent to the inner diameter of the penetration hole 61c (lower side locking hole 12a).

A locked groove 62d in an approximately U groove shape is formed recessed on the front side of the vehicle from an intermediate portion of a rear end surface in the vertical direction across the overall length thereof in the width direction. In addition, an upper surface of the main body portion 62a forms an approximately square annular-shaped step difference portion 62e at a border position with respect to the head portion 62b.

Moreover, in the memory base 61, a circle-shaped accommodation hole 61d is formed causing a rear end surface and the guide hole 61b to communicate with each other in the forward-rearward direction at an intermediate portion thereof in the vertical direction. An inner diameter of this accommodation hole 61d is set smaller than an opening width of the guide hole 61b in the width direction. Then, the second urging member 66 is accommodated in this accommodation hole 61d.

In addition, a plate guide hole 61e is formed in the memory base 61 to communicate in the forward-rearward direction at a central portion of the accommodation hole 61d in the vertical direction. This plate guide hole 61e has a slit shape extending in the width direction. The opening width of the plate guide hole 61e in the width direction is set greater than the opening width of the guide hole 61b in the width direction. Therefore, each of inner wall surfaces of the guide hole 61b and the accommodation holes 61d is cut off in a groove shape on both outer sides from the plate guide hole 61e in the width direction. Then, the locking plate 63 is inserted and guided into the plate guide hole 61e from in front of the vehicle to freely slide in the forward-rearward direction. In other words, the locking plate 63 is formed in an approximately square plate shape having a width equivalent to the opening width of the plate guide hole 61e in the width direction and fits into the plate guide hole 61e from the front of the vehicle. In this case, as illustrated in FIGS. 9A and 9B, the locking plate 63 causes its rear end portion to enter the accommodation hole 61d and is pressed to be in contact with the second urging member 66, thereby being constantly urged in front of the vehicle.

An approximately square-shaped open hole 63a is formed in a central portion of the locking plate 63. An opening width of this open hole 63a in the width direction is set equivalent to the opening width (width of main body portion 62a) of the guide hole 61b and the opening width in the forward-rearward direction is set greater than the opening width (length of main body portion 62a in forward-rearward direction) of the guide hole 61b in the forward-rearward direction.

Figure 9A:
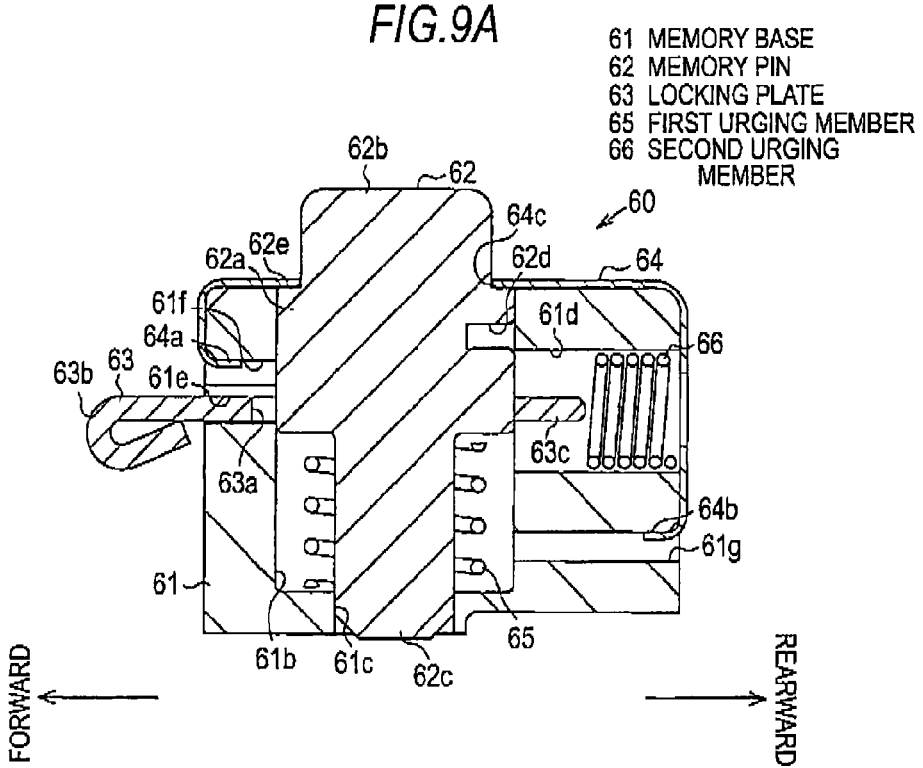
FIGS. 9A and 9B are longitudinal sectional views illustrating the memory piece and operations thereof.

As illustrated in FIG. 9A, the memory pin 62 which is urged upward by the first urging member 65 in the guide hole 61b basically penetrates the open hole 63a in the main body portion 62a positioned lower than the locked groove 62d. Therefore, the locking plate 63 which is urged by the second urging member 66 is locked to be prevented from moving in front of the vehicle by causing a seat rear side edge portion 63c of the open hole 63a to abut on the main body portion 62a. In this case, the movement of the memory pin 62 in the vertical direction is allowed inside the guide hole 61b (and the open hole 63a).

Figure 9B:
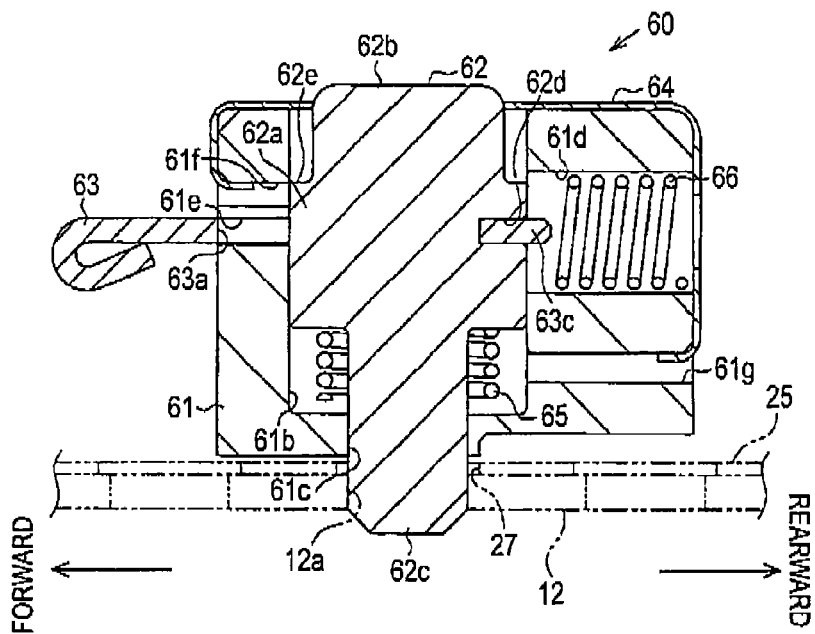

Meanwhile, as illustrated in FIG. 9B, if the memory pin 62 moves downward against the urging force of the first urging member 65 inside the guide hole 61b, and the locked groove 62d reaches a position of the locking plate 63 in the vertical direction, the seat rear side edge portion 63c of the open hole 63a which moves in front of the vehicle by the urging force of the second urging member 66 fits into the locked groove 62d. In this case, the movement of the memory pin 62 inside the guide hole 61b (and the open hole 63a) in the vertical direction is regulated.

A front end portion of the locking plate 63 is folded rearward from below in an approximate bow shape and forms a pressed portion 63b.

Moreover, in the memory base 61, an approximately square-shaped front side hooking hole 61f is formed which causes the front end surface and the guide hole 61b to communicate with each other in the forward-rearward direction above the plate guide hole 61e, and an approximately square-shaped rear side hooking hole 61g is formed which causes the rear end surface and the guide hole 61b to communicate with each other in the forward-rearward direction below the accommodation hole 61d. Then, the detachment prevention plate 64 is fixed to the memory base 61 in the front side hooking hole 61f and the rear side hooking hole 61g. In other words, the detachment prevention plate 64 is formed of the plate material and spreads along an upper surface of the memory base 61 while extending a front side hooking claw 64a and a rear side hooking claw 64b individually downward from the front end portion and the rear end portion. The detachment prevention plate 64 is in a state of abutting on the upper surface of the memory base 61, and its front side hooking claw 64a and its rear side hooking claw 64b respectively fit into the front side hooking hole 61f and the rear side hooking hole 61g, thereby being fixed to the memory base 61.

An approximately square-shaped head portion insertion hole 64c is formed in the central portion of the detachment prevention plate 64. An opening width of the head portion insertion hole 64c in the width direction and an opening width thereof in the forward-rearward direction are respectively set equivalent to a width of the head portion 62b and a length thereof in the forward-rearward direction. Then, as illustrated in FIG. 9A, the memory pin 62 urged upward to the first urging member 65 fits into the head portion insertion hole 64c at the head portion 62b. Therefore, the memory pin 62 urged by the first urging member 65 is locked to be prevented from moving upward by causing the step difference portion 62e to abut on a circumferential edge portion of the head portion insertion hole 64c. In other words, the detachment prevention plate 64 regulates an uppermost position of the memory pin 62 to prevent the memory pin 62 from being detached upward. The detachment prevention plate 64 also prevents the second urging member 66 from being detached behind the vehicle by being pressed to be in contact with the rear end of the second urging member 66 which urges the locking plate 63 in front of the vehicle.

Here, as illustrated in FIG. 9A, in a state where the memory pin 62 moves upward to cause the step difference portion 62*e* to abut on the circumferential edge portion of the head portion insertion hole 64*c* (state where memory pin 62 is locked to be prevented from moving upward by step difference portion 62*e*), the head portion 62*b* protrudes upward by a great amount from the detachment prevention plate 64. In this case, a length of a tip of the locking portion 62*c* protruding from the penetration hole 61*c* is set to be insignificant or nonexistent, and the memory piece 60 is movable in the longitudinal direction of the memory guide 25 (bottom wall portion 12).

Meanwhile, as illustrated in FIG. 9B, in a state where the seat rear side edge portion 63*c* of the open hole 63*a* of the locking plate 63 fits into the locked groove 62*d* of the memory pin 62 moved downward and the memory pin 62 is locked to be prevented from moving in the vertical direction, the locking portion 62*c* protrudes downward by a great amount from the memory base 61. Therefore, in this case, if there is an opening of the lower side locking hole 12*a* (penetration hole 27) on a lower side of the locking portion 62*c*, the tip of the locking portion 62*c* penetrates the penetration hole 27 and the lower side locking hole 12*a*. In this case, the memory piece 60 is fixed to the lower rail 3 (bottom wall portion 12), thereby being disabled from moving in the longitudinal direction thereof.

As illustrated in FIG. 4A, a stopper member 70 which is formed of a plate material is fixed to and supported by the upper rail 4 at a rearward position of the vehicle with respect to the locking lever 30. In other words, the stopper member 70 has a support wall portion 71 extending in the forward-rearward direction at a position lower than the memory pin 62 (head portion 62*b*) that protrudes further upward than the memory base 61 and protrudes in a relatively great length from the memory base 61. The stopper member 70 has a pressing piece 72 with a width wider than the support wall portion 71 and extending downward from the front end thereof, and also has an approximately L-shaped attachment piece 73 extending behind the vehicle on the upper side from the rear end of the support wall portion 71. The stopper member 70 is fastened to the upper rail 4 by a fastener 78 which penetrates the attachment piece 73 and the lid wall portion 15 in the vertical direction.

Figure 10:
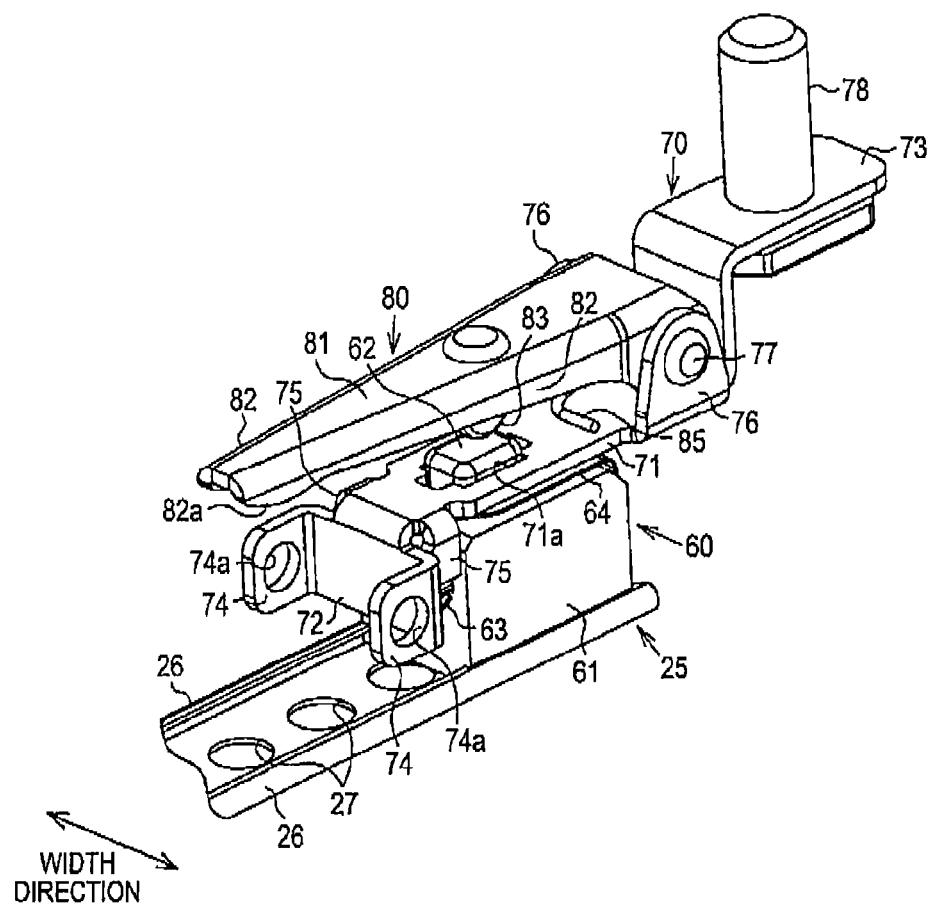
FIG. 10 is a perspective view illustrating a stopper member and surrounding structure thereof.
Figure 11:
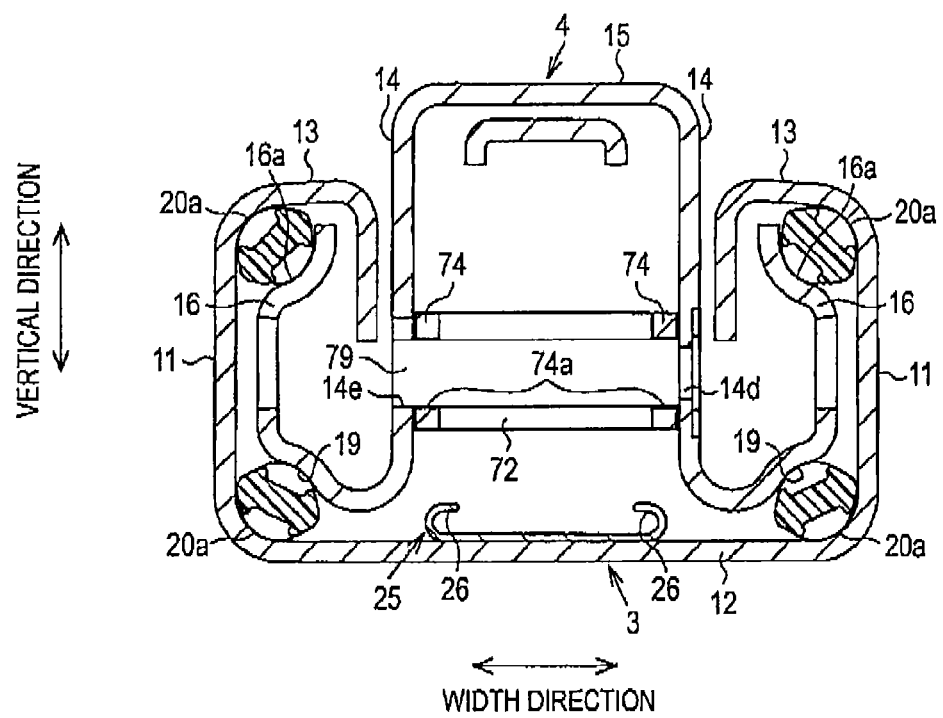
FIG. 11 is a cross-sectional view taken along line XI-XI in FIG. 4A.

In addition, as collectively illustrated in FIG. 10, the stopper member 70 has a pair of supported flanges 74 extending in front of the vehicle from both ends of the pressing piece 72 in the width direction. Circle-shaped axis penetration holes 74*a* communicating with each other in the width direction are respectively formed in these supported flanges 74. As illustrated in FIG. 11, a distance between both of these supported flanges 74 in the width direction is set equivalent to the distance between both of the second vertical wall portions 14 of the upper rail 4 in the width direction. Then, concentrically circle-shaped axis attachment holes 14*d* and 14*e* communicating with each other in the width direction are respectively formed in both of the second vertical wall portions 14. An inner diameter of the axis attachment hole 14*d* on one side is set smaller than an inner diameter of the axis attachment hole 14*e* on the other side. Then, a columnar-shaped fixing pin 79 inserted into the axis attachment holes 14*d* and 14*e* at both end portions thereof is supported by both of the second vertical wall portions 14. Needless to mention, a center line of this fixing pin 79 extends in the width direction.

The fixing pin 79 is fastened to the corresponding second vertical wall portion 14 at one end portion which is inserted into the axis attachment hole 14*d* and connected to be movable in the width direction with respect to the corresponding second vertical wall portion 14 at the other end portion which is inserted into the axis attachment hole 14*e*. This is done in order to absorb the deformation by moving the fixing pin 79 in the width direction when the deformation is generated in the cross-sectional shape of the upper rail 4 in accordance with interposition of the above-described ball 20*a* and the like between the lower rail 3 and the upper rail 4. In addition, the axis attachment holes 14*d* and 14*e* (fixing pin 79) are disposed in the central portion of the second lower side ball guide 19 and the second upper side ball guide 16*a* (slide portion for a pair of upper and lower balls 20*a*) in the vertical direction. This is done in order to suppress a deformation of the axis attachment holes 14*d* and 14*e* being minimized when the deformation is generated in the cross-sectional shape of the upper rail 4 in the above-described aspect.

As above, the stopper member 70 is reliably fixed to and supported by the upper rail 4 at two points in front and rear by the fastener 78 and the fixing pin 79.

As illustrated in FIG. 10, the stopper member 70 has a pair of stopper pieces 75 extending downward along the pressing piece 72 from both ends of the front end portion of the support wall portion 71 in the width direction. As illustrated in FIG. 4A, these stopper pieces 75 face the memory base 61 further upward than the locking plate 63 behind the vehicle thereof. Meanwhile, the pressing piece 72 faces the locking plate 63 behind vehicle thereof. In other words, when moving behind the vehicle along with the upper rail 4, the stopper member 70 is capable of abutting on the memory base 61 in both of the stopper pieces 75 and capable of abutting on the locking plate 63 (pressed portion 63*b*) in the pressing piece 72. Particularly, in a state where both of the stopper pieces 75 abut on the memory base 61, the pressing piece 72 moves the locking plate 63 behind the vehicle against the urging force of the second urging member 66. Accordingly, the memory pin 62 urged upward by the first urging member 65 causes the head portion 62*b* to protrude upward by a great amount from the detachment prevention plate 64.

As collectively illustrated in FIG. 10, an approximately cross-shaped upper side locking hole 71*a* communicating in the vertical direction is formed in the central portion of the support wall portion 71. An opening width of this upper side locking hole 71*a* in the width direction and an opening width thereof in the forward-rearward direction are each set equivalent to a width of the head portion 62*b* of the memory pin 62 and a length thereof in the forward-rearward direction. Then, in a state where the stopper member 70 abuts on the memory base 61 in both of the stopper pieces 75, the memory pin 62 urged upward by the first urging member 65 fits into the upper side locking hole 71*a* at the head portion 62*b* thereof.

Therefore, the memory pin 62 (memory piece 60) is movable in the forward-rearward direction along the lower rail 3 (memory guide 25) while disabled from moving in the forward-rearward direction with respect to the upper rail 4 to which the stopper member 70 is fixed. In other words, the memory pin 62 engages with the upper rail 4 in a state of protruding upward from the memory base 61 while unlocking the engagement with respect to the lower rail 3. Then, when the upper rail 4 moves in the forward-rearward direction with respect to the lower rail 3, the memory pin 62 (memory piece 60) integrally moves in the forward-rearward direction as well. Otherwise, when movement of the upper rail 4 in the forward-rearward direction with respect to the lower rail 3 is regulated by the locking lever 30, movement of the memory pin 62 (memory piece 60) in the forward-rearward direction is also regulated. In this case, any one of the plurality of lower side locking holes 12*a* (penetration holes 27) is set open on the lower side of the locking portion 62*c* of the memory pin 62.

As described above, when the locking portion 62c of the memory pin 62 protrudes downward by a great amount form the memory base 61 so that the tip thereof penetrates the penetration holes 61c and 27 and the lower side locking hole 12a, the memory piece 60 is fixed to the lower rail 3 (bottom wall portion 12), thereby being disabled from moving in the longitudinal direction thereof. In this case, the head portion 62b of the memory pin 62 protruding downward from the memory base 61 is set to be positioned further downward than the support wall portion 71. Accordingly, for example, the head portion 62b of the memory pin 62 is detached from the upper side locking hole 71a, thereby allowing the movement of the upper rail 4 in front of the vehicle, leaving the memory piece 60 remaining. In other words, the memory pin 62 engages with the lower rail 3 while being disengaged from the upper rail 4 in a state of protruding downward from the memory base 61.

As illustrated in FIG. 10, the stopper member 70 has a pair of attachment flanges 76 extending upward from both ends of the rear end portion of the support wall portion 71 in the width direction. Then, in the stopper member 70, a memory link 80 is connected to freely turn by an attachment pin 77 of which an axis line extends in the width direction, inwardly between both of the attachment flanges 76 in the width direction. In other words, the memory link 80 is formed of the plate material, has an approximately triangular-shaped top plate portion 81 being tapered toward the front of the vehicle, and has a pair of vertical wall portions 82 extending downward from both ends of the top plate portion 81 in the width direction. Then, the memory link 80 is connected to freely turn by the attachment pin 77 penetrating along with both of the attachment flanges 76 in the width direction in the rear end portions of both of the vertical wall portions 82 which are interposed between both of the attachment flanges 76.

As illustrated in FIG. 4A, the upper side of the memory link 80 extends in front of the vehicle along the support wall portion 71 of the stopper member 70, and the front end portion thereof reaches the rear end portion of the locking lever 30 (top plate portion 34) on the upper side. Then, the front end portion of each of the vertical wall portions 82 forms an approximately arc-shaped pressing portion 82a which meanderingly protrudes downward facing the locking lever 30 (top plate portion 34). Therefore, as illustrated in the change from FIG. 4A to FIG. 5A, if the memory link 80 turns about the attachment pin 77 in a counterclockwise direction (hereinafter, also referred to as "unlocking direction") as illustrated in the drawings, the locking lever 30 pressed by both of the pressing portions 82a is caused to turn about the support axis 22 against the urging force of the locking spring 50 to a side to which the locking plate 39 is lowered, that is, a side where each of the locking holes 39b is detached from the corresponding locking claws 13b.

In addition, an approximately tongue piece-shaped pressing protrusion portion 83 protruding downward and facing the upper side locking hole 71a is fixedly attached to a central portion of the top plate portion 81 in the forward-rearward direction. Therefore, as illustrated in the drawings in the change from FIG. 4A to FIG. 5A, if the memory link 80 turns about the attachment pin 77 in the counterclockwise direction as illustrated in the drawings, the pressing protrusion portion 83 is inserted into the upper side locking hole 71a. In this case, if the head portion 62b of the memory pin 62 fits into the upper side locking hole 71a, the memory pin 62 is pressed by the pressing protrusion portion 83 so as to protrude downward from the memory base 61 while being locked to be prevented from moving in the vertical direction by the locking plate 63 in the above-described aspect. At a turning position of the memory link 80 when the memory pin 62 pressed by the pressing protrusion portion 83 is locked to be prevented from moving in the vertical direction by the locking plate 63, the locking lever 30 pressed by both of the pressing portions 82a is set to reach the turning position in which each locking hole 39b of the locking plate 39 is detached from the corresponding locking claw 13b.

For example, a memory link urging member 85 formed with a torsional coil spring is wound around the attachment pin 77. This memory link urging member 85 is locked to the stopper member 70 (support wall portion 71) at an end and locked to the memory link 80 (top plate portion 81) at the other end, thereby turning the memory link 80 to be urged in a clockwise direction as illustrated in the drawings. The memory link 80 is caused to hold an initial turning position where the locking lever 30 and the memory piece 60 (memory pin 62) are released due to the urging force by the memory link urging member 85.

An approximately square-shaped insertion hole 15A which communicates in the vertical direction facing the front end portion of the memory link 80 is formed in the lid wall portion 15 of the upper rail 4. Then, in the upper portion of the upper rail 4 which is in the vicinity of the memory link 80 and the like, a first bell crank link 90 is connected to freely turn around a support axis 91 of which an axis line extends in the width direction as a lever member through an appropriate bracket. This first bell crank link 90 is formed of the plate material, has an approximately L-shaped pressing piece 90a with the support axis 91 as the center extending obliquely forward in a radial direction on a lower side, and has an approximately I-shaped attachment piece 90b with the support axis 91 as the center extending in a radial direction on the lower side.

Then, a tip portion which bends obliquely rearward on the lower side of the pressing piece 90a faces the insertion hole 15A (and front end portion of memory link 80) in the counterclockwise direction about the support axis 91 as illustrated in the drawings, and turning tracks in the turning direction are open through the insertion hole 15A. Therefore, as illustrated in the drawings in the change from FIG. 4A to FIG. 5A, if the first bell crank link 90 turns about the support axis 91 in the counterclockwise direction as illustrated in the drawings, the memory link 80 which is pressed by the tip portion of the pressing piece 90a passing through the insertion hole 15A turns about the attachment pin 77 in the unlocking direction against the urging force of the memory link urging member 85.

For example, a first lever urging member 92 formed with the torsional coil spring is wound around the support axis 91. This first lever urging member 92 is locked to the first bell crank link 90 at one end and locked to the support axis 91 at the other end, thereby turning the first bell crank link 90 to be urged in the clockwise direction as illustrated in the drawings. The first bell crank link 90 is caused to hold the initial turning position where the memory link 80 is released due to the urging force by the first lever urging member 92.

In addition, in the first bell crank link 90, an end 93a of an unlocking cable 93 is locked to the attachment piece 90b. This unlocking cable 93 extends behind the vehicle from the attachment piece 90b and is connected to the seatback 8 at the other end thereof. The unlocking cable 93 turns the first bell crank link 90 about the support axis 91 in the counterclockwise direction as illustrated in the drawings against the urging force of the first lever urging member 92 by pulling the attachment piece 90b behind the vehicle when the seatback 8 is shifted from a ready-for-seating state to a forward-inclined state (hereinafter, also referred to as "forward tilt"). In this case, as described above, the memory link 80 pressed by the tip portion of the pressing piece 90a turns about the attachment pin 77 in the unlocking direction against the urging farce of the memory link urging member 85.

Here, a state illustrated through FIGS. 4A and 4B is as in the following. The seatback 8 is not forward-inclined. The first bell crank link 90 is held at the initial turning position where the memory link 80 is released due to the urging force by the first lever urging member 92. Then, the memory link 80 is held at the initial turning position where the locking lever 30 and the memory piece 60 (memory pin 62) are released due to the urging force by the memory link urging member 85. In addition, the memory pin 62 protrudes from the memory base 61 due to the urging force of the first urging member 65 and engages with the stopper member 70 (upper rail 4) while being disengaged from the lower rail 3. In this case, any one of the plurality of lower side locking holes 12a (penetration holes 27) is set to be open on the lower side of the memory pin 62 (locking portion 62c), as described above.

In this state, if an operation force upon the unlocking handle 6 is released, the memory pin 62 (memory piece 60) is locked to be prevented from moving along with the upper rail 4 which is locked to be prevented from relatively moving with respect to the lower rail 3 by the locking lever 30 in the above-described aspect.

Meanwhile, if the unlocking handle 6 is operated, the memory pin 62 (memory piece 60) is enabled to move along with the upper rail 4 which is released from being locked to be prevented from relatively moving with respect to the lower rail 3 by the locking lever 30. That is, when the upper rail 4 is caused to move in the forward-rearward direction via the operation of the unlocking handle 6, the memory piece 60 integrally moves in the forward-rearward direction as well.

In other words, when the seatback 8 is in the ready-for-seating state, the memory piece 60 integrally moves with the upper rail 4 in the forward-rearward direction.

Figure 5A:
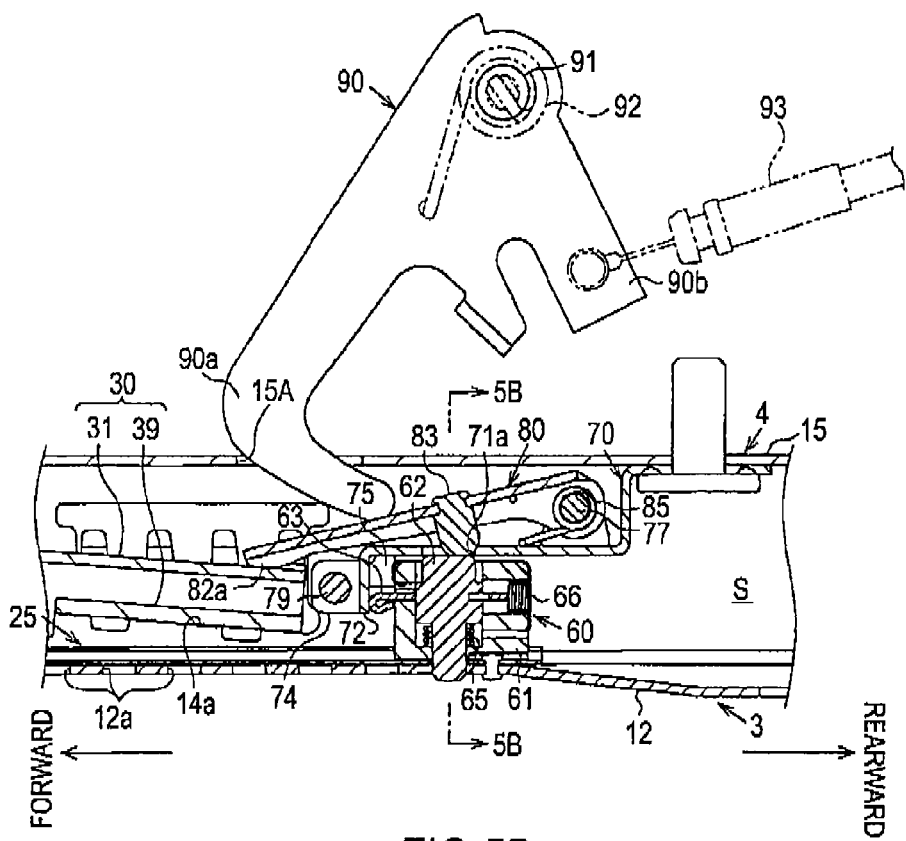
FIG. 5A is a longitudinal sectional view illustrating a state in which the prevented relative movements are unlocked in accordance with a forward tilt of a seatback.
Figure 5B:
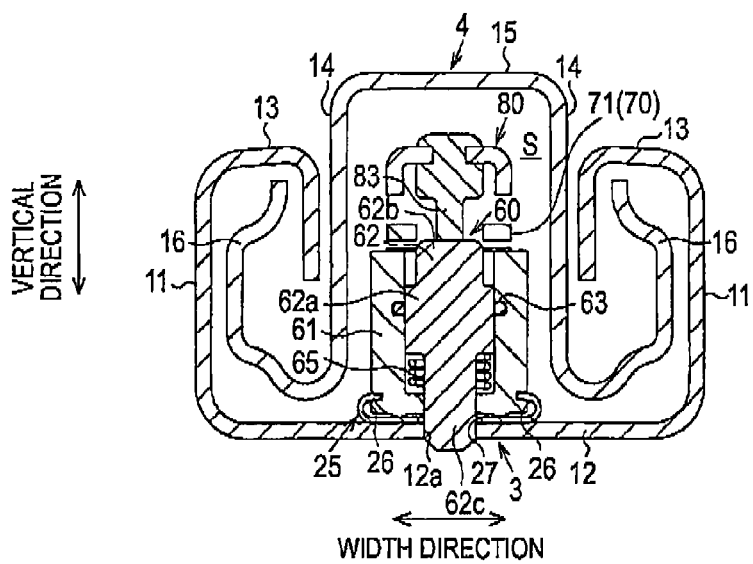
FIG. 5B is a cross-sectional view taken along line VB-VB in FIG. 5A.

Next, if the seatback 8 is tilted forward while being in the state illustrated in FIGS. 4A and 4B, as in the changed state illustrated in FIGS. 5A and 5B, the first bell crank link 90 turns about the support axis 91 in the counterclockwise direction as illustrated in the drawings, and thus, the memory link 80 pressed by the first bell crank link 90 (tip portion of pressing piece 90a) turns in the unlocking direction.

Figure 6A:
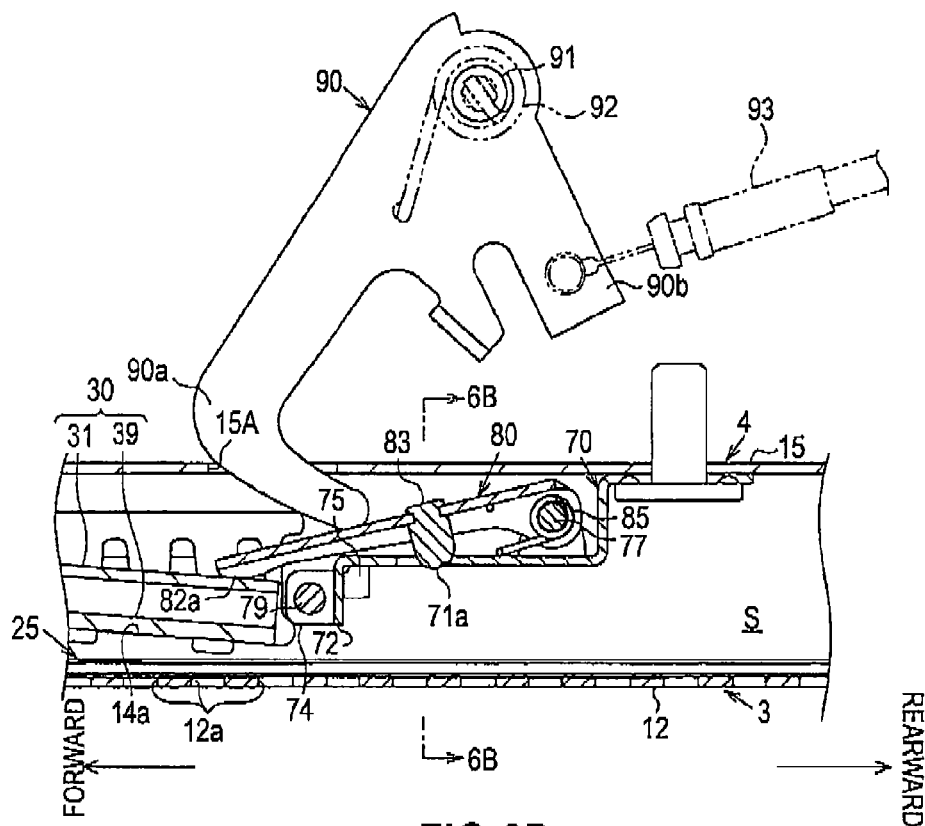
FIG. 6A is a longitudinal sectional view illustrating a state of being moved forward after the forward tilt of the seatback.
Figure 6B:
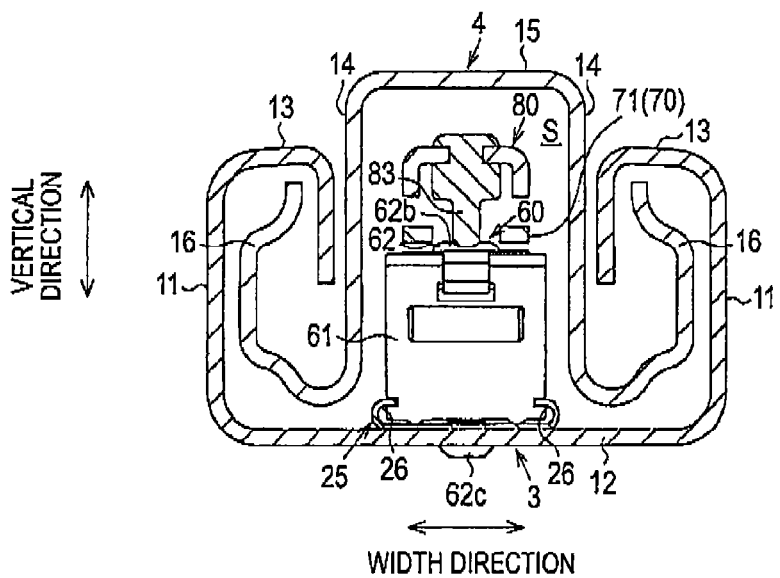
FIG. 6B is a cross-sectional view taken along line VIB-VIB in FIG. 6A.

Accordingly, locking lever 30 which is pressed by both of the pressing portions 82a of the memory link 80 unlocks the upper rail 4 prevented from relatively moving with respect to the lower rail 3. At the same time, the memory pin 62 which is pressed by the pressing protrusion portion 83 of the memory link 80 protrudes downward from the memory base 61, thereby engaging with the lower rail 3 while releasing the engagement with the stopper member 70 (upper rail 4). In this case, as in the changed state illustrated in FIGS. 6A and 6B, the upper rail 4 is enabled to move in front of the vehicle in a state of the memory pin 62 (memory piece 60) remaining in the lower rail 3.

The locking lever 30 is continuously pressed by both of the pressing portions 82a of the memory link 8 as long as the seatback 8 is in a forward tilt. Therefore, the state in which the upper rail 4 prevented from relatively moving with respect to the lower rail 3 is unlocked is maintained. In other words, when the seatback 8 is in the forward tilt, the upper rail 4 (seat 5) is allowed to move in front of the vehicle (so-called walk-in operation) until the movement in the direction thereof is regulated by the known stopper mechanism. In addition, if the seatback 8 is erected and the forward tilt is canceled when the upper rail 4 is in a state immediately before moving in front of the vehicle or in an arbitrary state of being moved in front of the vehicle, the locking lever 30 is released from both of the pressing portions 82a of the memory link 80 which return to the initial turning position, thereby locking the upper rail 4 to be prevented from relatively moving with respect to the lower rail 3.

Regarding maintaining the forward tilt of the seatback 8, if the upper rail 4 moves behind the vehicle after moving in front of the vehicle, as illustrated in the drawings in the change to the state of FIG. 7A, first of all, the pressing piece 72 of the stopper member 70 comes into contact with the locking plate 63 (pressed portion 63b). In this stage, both of the stopper pieces 75 of the stopper member 70 and the memory base 61 are away from each other in the forward-rearward direction.

Thereafter, if the upper rail 4 moves further behind the vehicle, as illustrated in the drawings in the change to the state of FIG. 7B, both of the stopper pieces 75 of the stopper member 70 abut on the memory base 61, thereby locking the upper rail 4 to be prevented from moving behind the vehicle. In other words, when the seatback 8 is in the forward tilt, both of the stopper pieces 75 (upper rail 4) of the stopper member 70 moving behind the seat are set to abut on the memory base 61. That is, the upper rail 4 stops at a position (stored position) immediately before moving in front of the vehicle in accordance with the forward tilt of the seatback 8. At the same time, the locking plate 63 pressed by the pressing piece 72 of the stopper member 70 moves behind the vehicle, and thus, the memory pin 62 prevented from vertically moving by the locking plate 63 is unlocked. However, in place of this, the pressing protrusion portion 83 of the memory link 80 approaches over the memory pin 62, thereby locking the memory pin 62 to be prevented from moving upward by the pressing protrusion portion 83.

Thereafter, if the seatback 8 is erected and the forward tilt is canceled, as illustrated in the drawings in the change to the state of FIG. 4A, the first bell crank link 90 turns about the support axis 91 in the clockwise direction as illustrated in the drawings to return to the initial turning position. In addition, the memory link 80 which is released from the first bell crank link 90 (tip portion of pressing piece 90a) also returns to the initial turning position.

Accordingly, the locking lever 30 released from both of the pressing portions 82a of the memory link 80 locks the upper rail 4 to be prevented from relatively moving with respect to the lower rail 3. At the same time, the memory pin 62 released from the pressing protrusion portion 83 of the memory link 80 protrudes from the memory base 61, thereby engaging with the stopper member 70 (upper rail 4) while being disengaged from the lower rail 3.

Consequently, when the upper rail 4 moves behind the seat after moving in front of the vehicle (in front of seat) in accordance with the forward tilt of the seatback 8, the state before the movement is restored via cancellation of the forward tilt of the seatback 8.

Next, surrounding structure of the lower rail 3 and the like on the other side opposite to one described above between the lower rails 3 and the like forming a pair will be described.

Figure 12A:
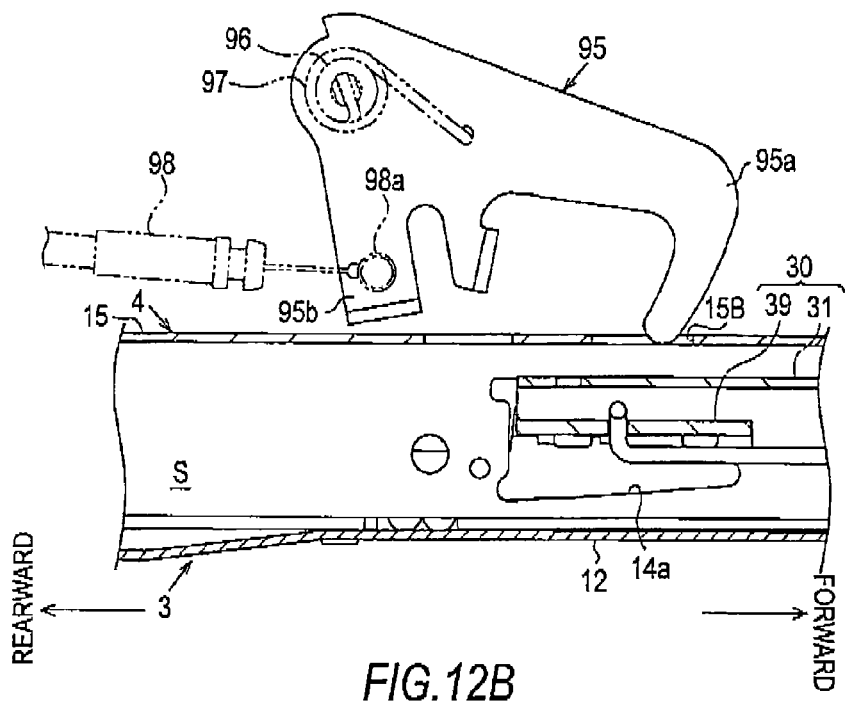
FIGS. 12A and 12B are longitudinal sectional views illustrating the same embodiment and operations thereof.
Figure 12B:
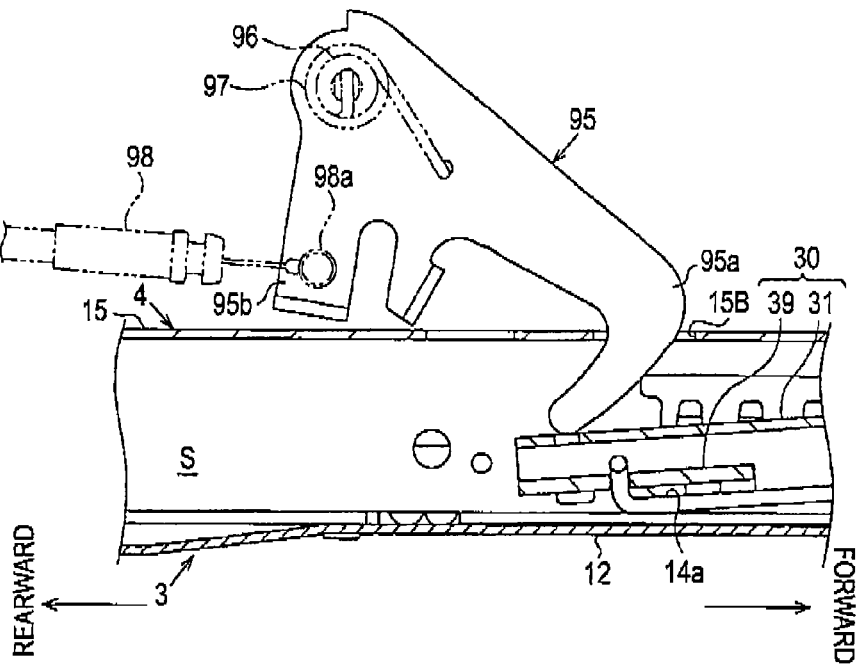

As illustrated in FIGS. 12A and 12B, the memory guide 25 and the memory piece 60 are not arranged in the lower rail 3 on the opposite side. Similarly, the stopper member 70 and the memory link 80 are not arranged in the upper rail 4 on the opposite side. Then, in the lid wall portion 15 of the upper rail 4, an approximately square-shaped insertion hole 15B is formed communicating in the vertical direction facing the rear end portion of the locking lever 30. Then, in the upper portion of the upper rail 4 in the vicinity of the rear end portion of the locking lever 30, a second bell crank link 95 as a second lever member is connected through an appropriate bracket to freely turn around a support axis 96 with an axis line extending in the width direction. This second bell crank link 95 is formed of the plate material, has an approximately L-shaped pressing piece 95a with the support axis 96 as the center extending obliquely forward in a radial direction on a lower side, and has an approximately I-shaped attachment piece 95b with the support axis 96 as the center extending in a radial direction on the lower side.

Then, a tip portion which bends obliquely rearward on the lower side of the pressing piece 95a faces the insertion hole 15B (and rear end portion of locking lever 30) in the clockwise direction having the support axis 96 as the center as illustrated in the drawings, and the turning tracks in the turning direction are open through the insertion hole 156. Therefore, as illustrated in the change from FIG. 12A to FIG. 12B, if the second bell crank link 95 turns about the support axis 96 in the clockwise direction as illustrated in the drawings, the locking lever 30 which is pressed by the tip portion of the pressing piece 95a passing through the insertion hole 15B unlocks the upper rail 4 prevented from relatively moving with respect to the lower rail 3.

A second lever urging member 97 formed with a torsional coil spring is wound around the support axis 96, for example. This second lever urging member 97 is locked to the second bell crank link 95 at an end and locked to support axis 96 at the other end, thereby turning the second bell crank link 95 to be urged in the counterclockwise direction as illustrated in the drawings. The second bell crank link 95 is caused to hold an initial turning position where the locking lever 30 is released due to the urging force by the second lever urging member 97.

In addition, in the second bell crank link 95, an end 98a of an unlocking cable 98 is locked to the attachment piece 95b. This unlocking cable 98 extends behind the vehicle from the attachment piece 95b and is connected to the seatback 8 at the other end thereof. The unlocking cable 98 turns the second bell crank link 95 about the support axis 96 in the clockwise direction as illustrated in the drawings against the urging force of the second lever urging member 97 by pulling the attachment piece 95b behind the vehicle in accordance with the forward tilt of the seatback 8. In this case, it is understood that the locking lever 30 pressed by the tip portion of the pressing piece 95a unlocks the upper rail 4 prevented from relatively moving with respect to the lower rail 3.

An unlocking moment of the prevented relative movements by the locking lever 30 in accordance with the forward tilt of the seatback 8 is set to be synchronized with the unlocking moment for the prevented relative movements by the locking lever 30 on the side described above.

In accordance with the forward tilt of the seatback 8, in a state immediately before the upper rail 4 moves in front of the vehicle or in an arbitrary state where the upper rail 4 has moved in front of the vehicle, if the seatback 8 is erected and the forward tilt is canceled, the locking lever 30 is released from the second bell crank link 95 which returns to the initial turning position, thereby locking the upper rail 4 to be prevented from relatively moving with respect to the lower rail 3. The locking moment of the relative movements by the locking lever 30 is also set to be synchronized with the locking moment of the relative movements by the locking lever 30 on the side described above.

Next, an operation according to the embodiment will be described.

The memory pin 62 protruding downward from the memory base 61 is locked to be prevented from moving upward, with the locking plate 63 moving in front of the seat by the urging force of the second urging member 66. Therefore, even if the memory pin 62 is released from the downward pressing force due to the memory link 80 (pressing protrusion portion 83) in accordance with the upper rail 4 moving in front of the seat after the forward tilt of the seatback 8, the memory pin 62 maintains a state of protruding downward from the memory base 61, that is, a state of being engaged with the lower rail 3.

Thereafter, if the upper rail 4 which has moved in front of the seat moves behind the seat, the upper rail 4 abutting on the memory base 61 in the stopper member 70 (both of the stopper pieces 75) in accordance with the restoration to the stored relative position is locked to be prevented from moving behind the seat by the memory pin 62 which engages with the lower rail 3. In this case, the locking plate 63 moves behind the seat due to the pressing force behind the seat by the stopper member 70 (pressing piece 72) against the urging force of the second urging member 66. Accordingly, the memory pin 62 prevented from moving upward by the locking plate 63 is unlocked.

Therefore, if the forward tilt of the seatback 8 is canceled in this state, the memory pin 62 released from the downward pressing force of the memory link 80 (pressing protrusion portion 83) is urged by the first urging member 65, thereby protruding from the memory base 61. Then, the memory pin 62 engaging with the upper rail 4 is enabled to integrally move with the upper rail 4 along with the memory base 61 and the like.

Consequently, when the relative position is stored, the memory piece 60 by itself can maintain the engaged state between the memory pin 62 and the lower rail 3.

As described above, according to the embodiment, it is possible to achieve the below-described effects.

(1) According to the embodiment, being in a state of being stored with the relative position, the memory piece 60 by itself can maintain the engaged state between the memory pin 62 and the lower rail 3, and thus, it is possible to cause the overall configuration of the apparatus to be simple and compact.

(2) According to the embodiment, the step difference portion 62e abuts on the detachment prevention plate 64 to regulate the uppermost position of the memory pin 62 protruding from the memory base 61 due to the urging force of the first urging member 65, and thus, it is possible for the memory pin 62 to be prevented from being detached from the memory base 61.

(3) According to the embodiment, it is possible to lock the memory pin 62 to be prevented from moving upward by adopting a significantly simple structure in which the seat rear side edge portion 63c of the open hole 63a fits into the locked groove 62d of the memory pin 62 due to the urging force of the second urging member 66. Meanwhile, it is possible to unlock the memory pin 62 prevented from moving upward by adopting a very simple structure in which the seat rear side edge portion 63c of the open hole 63a which fits into the locked groove 62d of the memory pin 62 due to the pressing force behind the seat is detached.

(4) According to the embodiment, it is possible to cause the memory pin 62 to be selectively engaged with the lower rail 3 or the upper rail 4 by adopting a very simple structure with the memory pin 62 being selectively inserted into the upper side locking hole 71a or the lower side locking hole 12a in accordance with the memory pin 62 moving back and forth in the vertical direction with respect to the memory base 61.

(5) According to the embodiment, the locking lever 30, the memory piece 60, the memory link 80 and the stopper member 70 are accommodated to be disposed inside the space S formed by the lower rail 3 and the upper rail 4. Then, it is possible to press the locking lever 30 in the turning direction in which the prevented relative movements are unlocked through the memory link 80 by the first bell crank link 90 and to press the memory piece 60 downward to be engaged and the like with the lower rail 3. Therefore, basically, only the first bell crank link 90 and the first lever urging member 92 are disposed in the outer portion of the lower rail 3 and the upper rail 4 (upper portion of upper rail 4), and thus, it is possible to decrease a disposition space necessary for an outside of the rail.

(6) According to the embodiment, in accordance with the turning in the unlocking direction, the memory link 80 causes the locking lever 30 to turn in the turning direction in which the prevented relative movements are unlocked at a position between the support axis 22 (axis line of locking lever 30) and the attachment pin 77 (axis line of the memory link 80) of the upper rail 4 in the longitudinal direction by pressing the locking lever 30 downward. In this case, the memory link 80 and the locking lever 30 are arranged to freely turn on both sides of the upper rail 4 in the longitudinal direction as interposing the engagement position (pressing position of the locking lever 30 by the memory link 80) therebetween, and thus, it is possible to effectively utilize the space of the upper rail 4 in the longitudinal direction.

Particularly, it is comparatively easy for the locking lever 30 and the memory link 80 to be interlocked together only by the first bell crank link 90 inside the upper rail 4 in which the disposition space is limited with the axis lines simply turning in parallel with each other, and thus, it is possible to easily synchronize the operations thereof.

(7) According to the embodiment, an end portion of the fixing pin 79 which causes the stopper member 70 to be supported by the upper rail 4 is fixedly attached to the second vertical wall portion 14 on the corresponding side, and the other end portion thereof is inserted through the second vertical wall portion 14 on the corresponding side to be movable in the width direction. Therefore, even if a deformation is generated in a cross-sectional shape of the upper rail 4 by mounting the ball 20*a* between the lower rail 3 and the upper rail 4, it is possible to prevent the stopper member 70 from being deformed by moving the fixing pin 79 in the width direction to absorb the deformation. Then, it is possible to lessen the possibility of causing the turning of the memory link 80 which is connected to the stopper member 70 through the attachment pin 77 to be unstable.

(8) According to the embodiment, the fixing pin 79 is disposed in the central portion between the second lower side ball guide 19 and the second upper side ball guide 16*a* in the vertical direction. Therefore, in the second lower side ball guide 19 and the second upper side ball guide 16*a*, even if the deformation is generated in the cross-sectional shape of the upper rail 4 by individually mounting the ball 20*a* between the lower rail 3 and the upper rail 4, the fixing pin 79 is not easily influenced by the deformation. Accordingly, it is possible to further prevent the stopper member 70 from being deformed.

(9) According to the embodiment, it is possible to reduce the number of components by utilizing the stopper member 70 to serve as an attachment bracket as well which supports the memory link 80.

(10) According to the embodiment, the memory piece 60 and the like, related to the restoration of the relative positions (stored relative positions) of the lower rail 3 and the upper rail 4 before the upper rail 4 moves in front of the seat in accordance with the forward tilt of the seatback 8, may be arranged on only one side between a pair thereof, and thus, it is possible to reduce the number of the components compared to the case of being arranged on both sides, for example. Then, on the other side where the first bell crank link 90 is not disposed, if the second bell crank link 95 turns from the initial turning position against the urging force of the second lever urging member 97 in accordance with the forward tilt of the seatback 8, the locking lever 30 is pressed in the turning direction in which the prevented relative movements are unlocked. Accordingly, the locking lever 30 unlocks the prevented relative movements. In other words, in accordance with the forward tilt of the seatback 8, it is possible to unlock the prevented relative movements by interlocking the locking levers 30 on both sides.

(11) According to the embodiment, the fixing position of the stopper member 70 with respect to the upper rail 4 by the fixing pin 79 is arranged in the vicinity of the abutting position of the stopper member 70 (both of stopper pieces 75) and the memory pieces 60 (memory base 61) at the time of restoration to the stored relative positions, and thus, it is possible to preferably secure the strength at the time of abutment therebetween.

(12) According to the embodiment, an end of the support axis 22 which causes the locking lever 30 (handle portion 31) to be supported by the upper rail 4 is fixed to the second vertical wall portion 14 on the corresponding side, and the other end portion thereof is inserted through the second vertical wall portion 14 on the corresponding side to be movable in the width direction. Therefore, even if a deformation is generated in a cross-sectional shape of the upper rail 4 by mounting the ball 20*a* between the lower rail 3 and the upper rail 4, it is possible to prevent the locking lever 30 from being deformed by moving the support axis 22 in the width direction to absorb the deformation. Furthermore, it is possible to lessen the possibility of causing the turning of the locking lever 30 to be unstable.

(13) According to the embodiment, the support axis 22 is disposed in the central portion between the second lower side ball guide 19 and the second upper side ball guide 16*a* in the vertical direction. Therefore, in the second lower side ball guide 19 and the second upper side ball guide 16*a*, even if the deformation is generated in the cross-sectional shape of the upper rail 4 by individually mounting the ball 20*a* between the lower rail 3 and the upper rail 4, the support axis 22 is not easily influenced by the deformation. Accordingly, it is possible to further prevent the locking lever 30 from being deformed.

(14) According to the embodiment, a function of pressing the locking plate 63, which locks the memory pin 62 to be prevented from moving upward, behind the vehicle, is additionally applied to the stopper member 70 (pressing piece 72), and thus, it is possible to reduce the number of the components.

(15) According to the embodiment, in accordance with the forward tilt of the seatback 8, in a state immediately before the upper rail 4 moves in front of the vehicle or in an arbitrary state where the upper rail 4 has moved in front of the vehicle (an arbitrary disposition state between the stored relative positions and the foremost position), it is considered that the seatback 8 is erected and the forward tilt is canceled. In this case, the locking lever 30 is released from the memory link 80 which returns to the initial turning position, and thus, it is possible to lock the upper rail 4 to be prevented from relatively moving with respect to the lower rail 3. In other words, even if there is no restoration to the stored relative positions, it is possible to lock the upper rail 4 to be prevented from relatively moving with respect to the lower rail 3. That is, even if there is no restoration to the stored relative positions, the crew cancels the forward tilt of the seatback 8 to sit on the seat 5, and thus, it is possible to automatically disable the seat 5 moving in the forward-rearward direction.

(16) According to the embodiment, the memory guide 25 is provided which guides the movement of the memory piece 60 in the forward-rearward direction, and thus, it is possible to prevent the memory piece 60 from deviating in the width direction whether in a stationary state or in movement state.

The above-described embodiment may be changed as follows.

In the embodiment, the structure is merely an example in which a downward pressing force is applied to the memory pin 62 in accordance with the forward tilt of the seatback B. For example, as described in Reference 1, the memory link 80 may be omitted while a lever for unlocking which presses the locking lever 30 in the turning direction in which the prevented relative movements are unlocked and a lever for a memory operation to apply a downward pressing force to the memory pin 62 are separately provided.

In the embodiment, the structure of the locking lever 30 is merely an example. For example, the locking lever may be configured to selectively lock the lower rail 3 and the upper rail 4 to be prevented from relatively moving by detaching from the lower rail 3 in accordance with the turning about the axis line which extends in the forward-rearward direction.

In the embodiment, in place of the detachment prevention plate 64, a step difference portion on which the step difference portion 62e of the memory pin 62 can abut may be formed in the memory base 61 to regulate the uppermost position of the memory pin 62 protruding from the memory base 61. In this case, for example, the memory pin 62 may be assembled to be placed above upward with respect to the memory base 61.

In the embodiment, if the memory pin 62 which is urged upward by the first urging member 65 is not detached from the memory base 61, the detachment prevention plate 64 may be omitted.

In the embodiment, an appropriate locking claw may be cut and raised from a rear side portion of the locking plate 63, and the locking claw may fit into the locked groove 62d of the memory pin 62, thereby locking the memory pin 62 to be prevented from moving upward. In this case, a position of the locking plate 63 itself in the vertical direction and a position of the locking claw in the vertical direction to fit into the locked groove 62d may deviate from each other.

In the embodiment, the memory guide 25 may be omitted.

In the embodiment, the memory link 80 may be connected to freely turn around the attachment pin (77) which is directly supported by the upper rail 4. In this case, an end portion of the attachment pin which is inserted into the second vertical wall portion 14 (axis attachment hole) on a side may be fastened to the second vertical wall portion 14 on the corresponding side, and the other end portion thereof which is inserted into the second vertical wall portion 14 (axis attachment hole) on the other side may be connected to the second vertical wall portion 14 to be movable in the width direction. Accordingly, when the deformation is generated in the cross-sectional shape of the upper rail 4 by mounting the above-described ball 20a and the like between the lower rail 3 and the upper rail 4, it is possible to absorb the deformation by the movement of the attachment pin in the width direction. In addition, the attachment pin (axis attachment hole) may be disposed in the central portion of the second lower side ball guide 19 and the second upper side ball guide 16a (slide portion of a pair of upper and lower balls 20a) in the vertical direction.

In this case, the attachment pin may be independent of the stopper member 70, However, if the attachment pin is connected to the stopper member 70 as well, in the stopper member 70, the attachment pin also is supported by the upper rail 4, and thus, it is possible to improve the strength to support the stopper member 70.

In the embodiment, the upper side locking hole (71a) may be formed in the upper rail 4 to be directly engaged with the memory pin 62 (head portion 62b) protruding from the memory base 61. In other words, the upper side locking hole related to the engagement and the like with the memory pin 62 may be independent of the stopper member 70.

In the embodiment, the memory piece 60 is disposed in both of the lower rails 3, and the stopper member 70 and the memory link 80 may be disposed in both of the upper rails 4. In other words, a mechanism (memory mechanism) related to a restoration operation after the forward tilt of the seatback 8 may be disposed on both sides of the lower rails 3 and the like.

In the embodiment, the axis line of the first bell crank link 90 (support axis 91) is not necessarily present along the width direction. Similarly, the axis line of the second bell crank link 95 (support axis 96) is not necessarily present along the width direction.

In the embodiment, the unlocking cables 93 and 98 which are connected to the first and second bell crank links 90 and 95 may be branch cables converging into one line in a connection portion with respect to the seatback 8.

In the embodiment, one of the unlocking cables 93 and 98 which is connected to one of the first and second bell crank links 90 and 95 may be omitted, and the first and second bell crank links 90 and 95 may be connected by a torque rod.

In the embodiment, the unlocking direction of the memory link 80 may be the same turning direction as that of the locking lever 30 unlocking the prevented relative movements.

In the embodiment, both of the end portions of the fixing pin 79 may be collectively and fixedly attached to the both of the second vertical wall portions 14.

In the embodiment, the fixing pin 79 is not necessarily disposed in the central portion between the second lower side ball guide 19 and the second upper side ball guide 16a in the vertical direction.

In the embodiment, the locking lever may be integrally formed with the handle portion and the locking plate in a sheet of the plate material.

In the embodiment, a round hole may be formed in the locking lever 30 (handle portion 31) in place of the long hole 35, and the locking lever 30 may be connected to the upper rail 4 to freely turn by fitting the support axis 22 into the round hole.

In the embodiment, the lower rail 3 may be configured to be bonded with plural sheets of plate material by welding and the like.

In the embodiment, the upper rail 4 may be configured to be bonded with plural sheets of plate material by welding and the like.

In the embodiment, the cross-sectional shapes of the lower rail 3 and the upper rail 4 are merely examples.

In the embodiment, the movement of the upper rail 4 (seat 5) in front of the vehicle in accordance with the forward tilt of the seatback 8 may be performed utilizing an urging force of an appropriate urging member or may be manually operated by the crew and the like.

In the embodiment, the lower rail 3 and the upper rail 4 (seat slide apparatus for a vehicle) may be configured to be arranged such that there is one of each with respect to the seat 5, or may be configured to be arranged such that there are three or more of each.

In the embodiment, the direction for relative movements of the lower rail and the upper rail may be a width direction of the vehicle.

An aspect of this disclosure provides a seat slide apparatus for a vehicle including: a lower rail that is configured to freely fixed to a vehicle floor; an upper rail that is configured to freely fixed to a seat which has a seat cushion forming a seating surface and a seatback being supported at a rear end portion of the seat cushion to freely inclined and is connected to be relatively movable with respect to the lower rail in a forward-rearward direction of the seat; and a memory member that engages with the upper rail while being disengaged from the lower rail to be integrally movable with the upper rail when the seatback is in a ready-for-seating state, engages with the lower rail while being disengaged from the upper rail when the seatback is shifted from the ready-for-seating state to a forward-inclined state, and abuts on the upper rail when the upper rail moves behind a seat with respect to the lower rail so as to regulate the upper rail moving behind the seat in a state of engaging with the lower rail while being disengaged from the upper rail, wherein the memory member includes: a memory base which is provided to be movable in the forward-rearward direction of the seat along the lower rail and abuts on the upper rail moving behind the seat when the seatback is shifted from the ready-for-seating state to the forward-inclined state; a memory pin which is mounted to be movable back and forth in a vertical direction with respect to the memory base, is configured to be applied with a downward pressing force when the seatback is shifted from the ready-for-seating state to the forward-inclined state, engages with the upper rail while being disengaged from the lower rail in a state of protruding upward from the memory base, and engages with the lower rail while being disengaged from the upper rail in a state of protruding downward from the memory base; a first urging member which urges the memory pin from the memory base to a side protruding upward; a locking plate which is mounted to be movable in the forward-rearward direction of the seat with respect to the memory base, locks the memory pin to be prevented from moving upward in a state where the memory pin moves in front of the seat while being in a state of protruding downward from the memory base, and moves behind the seat from a front position of the seat while unlocking the memory pin prevented from moving upward by abutting on the upper rail moving behind the seat; and a second urging member which urges the locking plate to a side moving in front of the seat.

With this configuration, the memory pin protruding downward from the memory base is locked to be prevented from moving upward by moving the locking plate in front of the seat due to an urging force of the second urging member. Therefore, even if the upper rail moves in front of the seat when the seatback is shifted from the ready-for-seating state to the forward-inclined state and the memory pin is released from the downward pressing force, the memory pin maintains a state of protruding downward from the memory base, that is, a state of engaging with the lower rail.

Thereafter, the upper rail which has moved in front of the seat moves behind the seat, thereby being locked to be prevented from moving by abutting on the memory base which is fixed to the lower rail through the memory pin in the state of engaging with the lower rail. In this case, relative positions of the lower rail and the upper rail are restored to the positions immediately before the upper rail moves in front of the seat while the seatback is shifted from the ready-for-seating state to the forward-inclined state. In addition, in this case, the upper rail abuts on the locking plate, and thus, the locking plate moves behind the seat against the urging force of the second urging member. Accordingly, the memory pin prevented from moving upward by the locking plate is unlocked.

Therefore, in this state, if the forward-inclined state of the seatback shifted from the ready-for-seating state is canceled, the memory pin released from the downward pressing force is urged by the first urging member, thereby protruding upward from the memory base. Then, the memory pin engaged with the upper rail is integrally movable with the upper rail together with the memory base and the like.

As above, if the seatback is shifted from the ready-for-seating state to the forward-inclined state, since the memory member itself can maintain the engagement state between the memory pin and the lower rail, it is possible to cause the overall configuration of the apparatus to be simple and compact.

In the seat slide apparatus for a vehicle, it is preferable that a locked groove is formed in the memory pin, an open hole through which the memory pin is smoothly inserted in the vertical direction is formed in the locking plate, and the locking plate locks the memory pin to be prevented from moving upward by fitting an edge portion of the open hole on a rear side of a seat into the locked groove of the memory pin protruding downward from the memory base in a state of moving in front of the seat due to the urging force of the second urging member.

With this configuration, it is possible to lock the memory pin to be prevented from moving upward through a significantly simple configuration in which the edge portion of the open hole on the rear side of a seat fits into the locked groove of the memory pin due to the urging force of the second urging member.

In the seat slide apparatus for a vehicle, it is preferable that the seat slide apparatus further includes a step difference portion that is formed on the memory pin; and a detachment prevention plate that is fixed to the memory base and abuts on the step difference portion to regulate an uppermost position of the memory pin protruding upward from the memory base due to the urging force of the first urging member.

With this configuration, since the uppermost position of the memory pin protruding upward from the memory base due to the urging force of the first urging member is regulated by abutment of the step difference portion and the detachment prevention plate, it is possible to prevent the memory pin from being detached from the memory base.

In the seat slide apparatus for a vehicle, it is preferable that the lower rail has a pair of first vertical wall portions which are provided side by side in a width direction, a bottom wall portion which connects both lower ends of the first vertical wall portions to each other, and a pair of first flanges which protrude inwardly from upper ends of both of the first vertical wall portions facing each other in the width direction and are folded downward to the lower end sides of the first vertical wall portions, the upper rail has a pair of second vertical wall portions which are provided side by side in the width direction between both of the first flanges, a lid wall portion which connects both upper ends of the second vertical wall portions to each other, and a pair of second flanges which individually protrude outwardly from lower ends of both of the second vertical wall portions away from each other in the width direction and are folded upward so as to be surrounded by the first vertical wall portions and the first flanges, the memory member is placed on the bottom wall portion, the upper rail is configured to have a stopper member which is fixed to the inside thereof abutting on the memory member when moving behind the seat with respect to the lower rail while the seatback is shifted from the ready-for-seating state to the forward-inclined state, and the seat slide apparatus for a vehicle further includes: a locking member that is connected to the upper rail to freely turn about an axis line extending in the width direction between both of the second vertical wall portions in the width direction and selectively locks the lower rail and the upper rail to be prevented from relatively moving by being detached from the lower rail in accordance with turning in the vertical direction; a memory link that is connected to the upper rail to freely turn about an axis line extending in the width direction between both of the second vertical wall portions in the width direction, holds an initial turning position where the locking member and the memory member are released due to the urging force by a memory link urging member, and presses the locking member in a turning direction of unlocking the prevented relative movements while pressing the memory member downward by turning in an unlocking direction against the urging force of the memory link urging member; and a lever member that is connected to an upper portion of the upper rail to freely turn, holds an initial turning position where the memory link is released due to the urging force by a lever urging member, and presses the memory link in the unlocking direction by turning against the urging force of the lever urging member when the seatback is shifted from the ready-for-seating state to the forward-inclined state.

With this configuration, if the lever member turns from the initial turning position thereof against the urging force of the lever urging member while the seatback is shifted from the ready-for-seating state to the forward-inclined state, the memory link is pressed in the unlocking direction. Accordingly, if the memory link turns in the unlocking direction from the initial turning position thereof against the urging force of the memory link urging member, the locking member is pressed in the turning direction in which the prevented relative movements are unlocked while pressing the memory member downward. Accordingly, the locking member unlocks the prevented relative movements. At the same time, the memory member engages with the lower rail while being disengaged from the upper rail. In this case, the upper rail is movable in front of the seat. Meanwhile, when the upper rail is on the verge of movement behind the seat, the stopper member abuts on the memory member that is in a state of being fixed with the lower rail, and thus, the upper rail is locked to be prevented from moving. In other words, when the seatback is shifted from the ready-for-seating state to a forward-inclined state, the upper rail is movable only in front of the seat.

If the upper rail moves behind the seat after moving in front of the seat when the seatback is shifted from the ready-for-seating state to a forward-inclined state, the stopper member abuts on the memory member that is in the state of being fixed with the lower rail, and thus, the upper rail is locked to be prevented from moving. Then, while the seatback is shifted from the ready-for-seating state to a forward-inclined state, relative positions (stored relative positions) of the lower rail and the upper rail before the upper rail moves in front of the seat are restored.

Thereafter, if the forward-inclined state of the seatback shifted from the ready-for-seating state is canceled, the lever member returns to the initial turning position thereof due to the urging force of the lever urging member, and the memory link returns to the initial turning position thereof due to the urging force of the memory link urging member. Therefore, the locking member released from the memory link locks the relative movements to be prevented. At the same time, the memory member engages with the upper rail while being disengaged from the lower rail due to the urging force of the first urging member.

Consequently, when the upper rail moves behind the seat after moving in front of the seat while the seatback is shifted from the ready-for-seating state to a forward-inclined state, the state before the movement is restored via cancellation of the forward-inclined state of the seatback shifted from the ready-for-seating state.

In this case, the locking member, the memory member, the memory link and the stopper member are disposed to be accommodated in a space formed by the lower rail and the upper rail. In addition, through the memory link, it is possible to cause the lever member to press the locking member in the turning direction in which the prevented relative movements are unlocked and to press the memory member downward for engaging and the like with the lower rail. Therefore, basically, only the lever member and the lever urging member are disposed outside (upper portion of upper rail) the lower rail and the upper rail, and thus, it is possible to further decrease a disposition space necessary for an outside of the rail.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat slide apparatus for a vehicle comprising:
a lower rail that is configured to be fixed to a vehicle floor;
an upper rail that is configured to be fixed to a seat which has a seat cushion forming a seating surface and a seatback being supported at a rear end portion of the seat cushion to be freely inclined and is connected to be relatively movable with respect to the lower rail in a forward-rearward direction of the seat; and
a memory member that engages with the upper rail while being disengaged from the lower rail to be integrally movable with the upper rail when the seatback is in a ready-for-seating state, engages with the lower rail while being disengaged from the upper rail when the seatback is shifted from the ready-for-seating state to a forward-inclined state, and abuts on the upper rail when the upper rail moves rearward with respect to the lower rail so as to regulate the upper rail moving rearward in a state of engaging with the lower rail while being disengaged from the upper rail,
wherein the memory member includes:
a memory base which is provided to be movable in the forward-rearward direction of the seat along the lower rail and abuts on the upper rail moving rearward when the seatback is shifted from the ready-for-seating state to the forward-inclined state;
a memory pin which is mounted to be movable back and forth in a vertical direction with respect to the memory base, is configured to be applied with a downward pressing force when the seatback is shifted from the ready-for-seating state to the forward-inclined state, engages with the upper rail while being disengaged from the lower rail in a state of protruding upward from the memory base, and engages with the lower rail while being disengaged from the upper rail in a state of protruding downward from the memory base;
a first urging member which urges the memory pin from the memory base in an upward direction;

a locking plate, which is mounted to be movable in the forward-rearward direction of the seat with respect to the memory base, locks the memory pin to be prevented from moving upward in a state where the memory pin moves in front of the seat while being in a state of protruding downward from the memory base, and moves rearward from a front position of the seat while unlocking the memory pin, which is prevented from moving upward by abutting on the upper rail moving rearward; and a second urging member which urges the locking plate in a forward direction of the seat.

2. The seat slide apparatus for a vehicle according to claim 1, wherein a locked groove is formed in the memory pin, an open hole through which the memory pin is smoothly inserted in the vertical direction is formed in the locking plate, and the locking plate locks the memory pin to be prevented from moving upward by fitting an edge portion of the open hole on a rearward side of the seat into the locked groove of the memory pin protruding downward from the memory base in a state of moving in front of the seat due to an urging force of the second urging member.

3. The seat slide apparatus for a vehicle according to claim 2, further comprising:

a step difference portion that is formed on the memory pin; and a detachment prevention plate that is fixed to the memory base and abuts on the step difference portion to regulate an uppermost position of the memory pin protruding upward from the memory base due to the urging force of the first urging member.

4. The seat slide apparatus for a vehicle according to claim 2, wherein the memory pin engages with the upper rail by fitting into an upper side locking hole which is formed in the upper rail in the state of protruding upward from the memory base and engages with the lower rail by fitting into a lower side locking hole which is formed in the lower rail in the state of protruding downward from the memory base.

5. The seat slide apparatus for a vehicle according to claim 2, wherein the lower rail has a pair of first vertical wall portions which are provided side by side in a width direction, a bottom wall portion which connects both lower ends of the first vertical wall portions to each other, and a pair of first flanges which protrude inwardly from upper ends of both of the first vertical wall portions facing each other in the width direction and are folded downward to the lower end sides of the first vertical wall portions, the upper rail has a pair of second vertical wall portions which are provided side by side in the width direction between both of the first flanges, a lid wall portion which connects both upper ends of the second vertical wall portions to each other, and a pair of second flanges which individually protrude outwardly from lower ends of both of the second vertical wall portions away from each other in the width direction and are folded upward so as to be surrounded by the first vertical wall portions and the first flanges, the memory member is placed on the bottom wall portion, the upper rail is configured to have a stopper member which is fixed to the inside thereof abutting on the memory member when moving rearward with respect to the lower rail while the seatback is shifted from the ready-for-seating state to the forward-inclined state, and the seat slide apparatus for a vehicle further comprises:

a locking member that is connected to the upper rail to freely turn about an axis line extending in the width direction between both of the second vertical wall portions in the width direction and selectively locks the lower rail and the upper rail to be prevented from relatively moving by being detached from the lower rail in accordance with turning in the vertical direction;

a memory link that is connected to the upper rail to freely turn about an axis line extending in the width direction between both of the second vertical wall portions in the width direction, holds an initial turning position where the locking member and the memory member are released due to the urging force by a memory link urging member, and presses the locking member in a turning direction of unlocking the prevented relative movements while pressing the memory member downward by turning in an unlocking direction against the urging force of the memory link urging member; and a lever member that is connected to an upper portion of the upper rail to freely turn, holds an initial turning position where the memory link is released due to the urging force by a lever urging member, and presses the memory link in the unlocking direction by turning against the urging force of the lever urging member when the seatback is shifted from the ready-for-seating state to the forward-inclined state.

6. The seat slide apparatus for a vehicle according to claim 1, further comprising:

a step difference portion that is formed on the memory pin; and a detachment prevention plate that is fixed to the memory base and abuts on the step difference portion to regulate an uppermost position of the memory pin protruding upward from the memory base due to the urging force of the first urging member.

7. The seat slide apparatus for a vehicle according to claim 6, wherein the memory pin engages with the upper rail by fitting into an upper side locking hole which is formed in the upper rail in the state of protruding upward from the memory base and engages with the lower rail by fitting into a lower side locking hole which is formed in the lower rail in the state of protruding downward from the memory base.

8. The seat slide apparatus for a vehicle according to claim 6, wherein the lower rail has a pair of first vertical wall portions which are provided side by side in a width direction, a bottom wall portion which connects both lower ends of the first vertical wall portions to each other, and a pair of first flanges which protrude inwardly from upper ends of both of the first vertical wall portions facing each other in the width direction and are folded downward to the lower end sides of the first vertical wall portions, the upper rail has a pair of second vertical wall portions which are provided side by side in the width direction between both of the first flanges, a lid wall portion which connects both upper ends of the second vertical wall portions to each other, and a pair of second flanges which individually protrude outwardly from lower ends of both of the second vertical wall portions away from each other in the width direction and are folded upward so as to be surrounded by the first vertical wall portions and the first flanges, the memory member is placed on the bottom wall portion, the upper rail is configured to have a stopper member which is fixed to the inside thereof abutting on the memory member when moving rearward with respect to the lower rail while the seatback is shifted from the ready-for-seating state to the forward-inclined state, and the seat slide apparatus for a vehicle further comprises:

a locking member that is connected to the upper rail to freely turn about an axis line extending in the width direction between both of the second vertical wall portions in the width direction and selectively locks the lower rail and the upper rail to be prevented from relatively moving by being detached from the lower rail in accordance with turning in the vertical direction;

a memory link that is connected to the upper rail to freely turn about an axis line extending in the width direction between both of the second vertical wall portions in the width direction, holds an initial turning position where the locking member and the memory member are released due to the urging force by a memory link urging member, and presses the locking member in a turning direction of unlocking the prevented relative movements while pressing the memory member downward by turning in an unlocking direction against the urging force of the memory link urging member; and a lever member that is connected to an upper portion of the upper rail to freely turn, holds an initial turning position where the memory link is released due to the urging force by a lever urging member, and presses the memory link in the unlocking direction by turning against the urging force of the lever urging member when the seatback is shifted from the ready-for-seating state to the forward-inclined state.

9. The seat slide apparatus for a vehicle according to claim 1, wherein the memory pin engages with the upper rail by fitting into an upper side locking hole which is formed in the upper rail in the state of protruding upward from the memory base and engages with the lower rail by fitting into a lower side locking hole which is formed in the lower rail in the state of protruding downward from the memory base.

10. The seat slide apparatus for a vehicle according to claim 9, wherein the lower rail has a pair of first vertical wall portions which are provided side by side in a width direction, a bottom wall portion which connects both lower ends of the first vertical wall portions to each other, and a pair of first flanges which protrude inwardly from upper ends of both of the first vertical wall portions facing each other in the width direction and are folded downward to the lower end sides of the first vertical wall portions, the upper rail has a pair of second vertical wall portions which are provided side by side in the width direction between both of the first flanges, a lid wall portion which connects both upper ends of the second vertical wall portions to each other, and a pair of second flanges which individually protrude outwardly from lower ends of both of the second vertical wall portions away from each other in the width direction and are folded upward so as to be surrounded by the first vertical wall portions and the first flanges, the memory member is placed on the bottom wall portion, the upper rail is configured to have a stopper member which is fixed to the inside thereof abutting on the memory member when moving rearward with respect to the lower rail while the seatback is shifted from the ready-for-seating state to the forward-inclined state, and the seat slide apparatus for a vehicle further comprises:

a locking member that is connected to the upper rail to freely turn about an axis line extending in the width direction between both of the second vertical wall portions in the width direction and selectively locks the lower rail and the upper rail to be prevented from relatively moving by being detached from the lower rail in accordance with turning in the vertical direction;

a memory link that is connected to the upper rail to freely turn about an axis line extending in the width direction between both of the second vertical wall portions in the width direction, holds an initial turning position where the locking member and the memory member are released due to the urging force by a memory link urging member, and presses the locking member in a turning direction of unlocking the prevented relative movements while pressing the memory member downward by turning in an unlocking direction against the urging force of the memory link urging member; and a lever member that is connected to an upper portion of the upper rail to freely turn, holds an initial turning position where the memory link is released due to the urging force by a lever urging member, and presses the memory link in the unlocking direction by turning against the urging force of the lever urging member when the seatback is shifted from the ready-for-seating state to the forward-inclined state.

11. The seat slide apparatus for a vehicle according to claim 1, wherein the lower rail has a pair of first vertical wall portions which are provided side by side in a width direction, a bottom wall portion which connects both lower ends of the first vertical wall portions to each other, and a pair of first flanges which protrude inwardly from upper ends of both of the first vertical wall portions facing each other in the width direction and are folded downward to the lower end sides of the first vertical wall portions, the upper rail has a pair of second vertical wall portions which are provided side by side in the width direction between both of the first flanges, a lid wall portion which connects both upper ends of the second vertical wall portions to each other, and a pair of second flanges which individually protrude outwardly from lower ends of both of the second vertical wall portions away from each other in the width direction and are folded upward so as to be surrounded by the first vertical wall portions and the first flanges, the memory member is placed on the bottom wall portion, the upper rail is configured to have a stopper member which is fixed to the inside thereof abutting on the memory member when moving rearward with respect to the lower rail while the seatback is shifted from the ready-for-seating state to the forward-inclined state, and the seat slide apparatus for a vehicle further comprises:

a locking member that is connected to the upper rail to freely turn about an axis line extending in the width direction between both of the second vertical wall portions in the width direction and selectively locks the lower rail and the upper rail to be prevented from relatively moving by being detached from the lower rail in accordance with turning in the vertical direction;

a memory link that is connected to the upper rail to freely turn about an axis line extending in the width direction between both of the second vertical wall portions in the width direction, holds an initial turning position where the locking member and the memory member are released due to the urging force by a memory link urging member, and presses the locking member in a turning direction of unlocking the prevented relative movements while pressing the memory member downward by turning in an unlocking direction against the urging force of the memory link urging member; and a lever member that is connected to an upper portion of the upper rail to freely turn, holds an initial turning position where the memory link is released due to the urging force by a lever urging member, and presses the memory link in the unlocking direction by turning against the urging force of the lever urging member when the seatback is shifted from the ready-for-seating state to the forward-inclined state.

\* \* \* \* \*